United States Patent
Wang et al.

(10) Patent No.: US 11,706,820 B2
(45) Date of Patent: Jul. 18, 2023

(54) USER EQUIPMENT, NETWORK NODE AND METHODS THEREIN FOR HANDLING A TWO-STEP RANDOM ACCESS PROCEDURE IN A WIRELESS COMMUNICATIONS NETWORK

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/268,734

(22) PCT Filed: Sep. 6, 2019

(86) PCT No.: PCT/SE2019/050839
§ 371 (c)(1),
(2) Date: Feb. 16, 2021

(87) PCT Pub. No.: WO2020/060466
PCT Pub. Date: Mar. 26, 2021

(65) Prior Publication Data
US 2021/0307082 A1    Sep. 30, 2021

Related U.S. Application Data

(60) Provisional application No. 62/732,045, filed on Sep. 17, 2018.

(51) Int. Cl.
*H04W 74/08*    (2009.01)
*H04W 72/0453*    (2023.01)
(Continued)

(52) U.S. Cl.
CPC ....... *H04W 74/0841* (2013.01); *H04L 1/0003* (2013.01); *H04L 1/1819* (2013.01);
(Continued)

(58) Field of Classification Search
None
See application file for complete search history.

(56) References Cited

U.S. PATENT DOCUMENTS

2015/0289292 A1*   10/2015   Sun .................... H04L 27/2613
                                                                370/329
2018/0220452 A1*    8/2018   Sivanesan ........... H04W 72/085
(Continued)

FOREIGN PATENT DOCUMENTS

WO    2018135631 A1    7/2018

OTHER PUBLICATIONS

International Search Report and Written Opinion dated Nov. 12, 2019 for International Application No. PCT/SE2019/050839 filed Sep. 6, 2019, consisting of 13-pages.
(Continued)

*Primary Examiner* — Marcus Smith
(74) *Attorney, Agent, or Firm* — Christopher & Weisberg, P.A.

(57) ABSTRACT

A method, performed by a UE, for handling a two-step Random Access Channel (RACH) procedure, in a wireless communications network is provided. When a Random Access (RA) event is triggered the UE obtains a Physical Random Access Channel (PRACH) preamble corresponding to the RA event and/or a desired grant size, by randomly select a preamble mapping to a table entry providing a required size of a Physical Uplink Shared Channel (PUSCH) resource for the triggered RA event. The UE then obtains a grant from the PUSCH resource table based on the obtained
(Continued)

PRACH preamble, which grant includes an indication of a PUSCH resource to use for a Msg 3 transmission in uplink.

16 Claims, 13 Drawing Sheets

(51) Int. Cl.
    *H04W 72/1263*    (2023.01)
    *H04W 72/23*      (2023.01)
    *H04L 1/1812*     (2023.01)
    *H04L 1/00*       (2006.01)
    *H04W 74/00*     (2009.01)

(52) U.S. Cl.
    CPC ... *H04W 72/0453* (2013.01); *H04W 72/1263* (2013.01); *H04W 72/23* (2023.01); *H04W 74/008* (2013.01)

(56) References Cited

U.S. PATENT DOCUMENTS

| | | | | |
|---|---|---|---|---|
| 2018/0279375 | A1* | 9/2018 | Jeon | H04W 74/0833 |
| 2019/0166529 | A1* | 5/2019 | Chen | H04W 36/38 |
| 2019/0320418 | A1* | 10/2019 | Ko | H04W 72/0446 |
| 2019/0320467 | A1* | 10/2019 | Freda | H04W 74/0833 |
| 2019/0387546 | A1* | 12/2019 | Li | H04L 27/26025 |
| 2020/0337068 | A1* | 10/2020 | Yi | H04L 5/0094 |

OTHER PUBLICATIONS

3GPP TS 36.321 V15.0.0; 3rd Generation Partnership Project; Technical Specification Group Radio Access Network; Evolved Universal Terrestrial Radio Access (E-UTRA); Medium Access Control (MAC) protocol specification (Release 15); Dec. 2017, consisting of 109-pages.

3GPP TS 37.213 V15.0.0; 3rd Generation Partnership Project; Technical Specification Group Radio Access Network; Physical layer procedures for shared spectrum channel access (Release 15); Jun. 2018, consisting of 20-pages.

3GPP TSG-RAN WG1 NR adhoc R1-1700300; Title: NR two-step random access procedure; Agenda Item: 5.1.1.4.3; Source: Ericsson; Document for: Discussion, Decision; Date and Location: Jan. 16-20, 2017, Spokane, USA, consisting of 4-pages.

3GPP TSG RAN WG1 AH_NR Meeting R1-1700703; Title: 2-step random access procedure; Agenda Item: 5.1.1.4.3; Source: InterDigital Communications; Document for: Discussion, Decision; Date and Location: Jan. 16-20, 2017, Spokane, USA, consisting of 4-pages.

3GPP TSG RAN WG1 NR adhoc R1-1700892; Title: NR 2-step random access procedure; Agenda Item: 5.1.1.4.3; Source: Samsung; Document for: Discussion and Decision; Date and Location: Jan. 16-20, 2017, Spokane, Washington, consisting of 6-pages.

* cited by examiner

USER EQUIPMENT, NETWORK NODE AND METHODS THEREIN FOR HANDLING A TWO-STEP RANDOM ACCESS PROCEDURE IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/050839, filed Sep. 6, 2019 entitled "USER EQUIPMENT, NETWORK NODE AND METHODS THEREIN FOR HANDLING A TWO-STEP RANDOM ACCESS PROCEDURE IN A WIRELESS COMMUNICATIONS NETWORK," which claims priority to U.S. Provisional Application No. 62/732,045, filed Sep. 17, 2018, the entireties of both of which are incorporated herein by reference.

TECHNICAL FIELD

Embodiments herein relate to a user equipment (UE), a network node and methods performed therein, for handling a two-step Random Access (RA) procedure in a wireless communications network.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE or gNBs in 5G, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Radio Resource Management (RRM) Measurements in NR Unlicensed Spectrum

In order to tackle the ever increasing data demands, NR is considered for both licensed and unlicensed spectrum. A licensed spectrum comprises frequencies made available to companies for a specific use, i.e. cellular companies connecting users through wireless phone services. An unlicensed spectrum is publicly owned, has light rules to follow and is free, which means that no paid license is needed to use it. For instance, the spectrum used by Wi-Fi equipment is an example of an unlicensed spectrum. Therefore, 3GPP has defined a study item on NR-based access to unlicensed spectrum which was approved at 3GPP RAN-77. At this study item, compared to LTE License Assisted Access (LAA), NR-Unlicensed (NR-U) also need to support Dual Connectivity (DC) and standalone scenarios, where Medium Access Control (MAC) procedures including Random Access Channel (RACH) and scheduling procedures on unlicensed spectrum are subject to Listen-before-Talk (LBT) failures. In LTE LAA there was no such restriction, since there was licensed spectrum in the LTE LAA scenario so the RACH and scheduling related signalling may be transmitted on the licensed spectrum instead of the unlicensed spectrum.

The RRM procedures in NR-U may be generally rather similar as in LAA, since NR-U is aiming to reuse LAA, enhanced LAA (eLAA) and/or further enhanced LAA (fe-LAA) technologies as much as possible to handle the coexistence between NR-U and other legacy Radio Access Technologies (RATs). Channel access and/or channel selection for LAA is an important aspect for co-existence with other RATs such as Wi-Fi. For instance, LAA has aimed to use carriers that are congested with Wi-Fi. Therefore, RRM measurements are crucial for the purpose of avoiding congestion on carriers.

In the licensed spectrum, the UE measures Reference Signal Received Power (RSRP) and Reference Signal Received Quality (RSRQ) of a downlink radio channel and provides the measurement reports to its serving eNB/gNB. However, the RSRP and/or RSRQ do not reflect the interference strength on the carrier. Another metric Received Signal Strength Indicator (RSSI) may however be used for the purpose of detecting the interference strength. At the eNB/gNB side, the RSSI may be derived based on the received RSRP and RSRQ reports, however, this requires that these are available. Due to the LBT failure, some reports regarding RSRP or RSRQ may be blocked. This may e.g. be either due to that the reference signal transmission, such as a transmission of Discovery Reference Signal (DRS) is blocked in the downlink (DL) or due to the measurement report being blocked in the uplink (UL). Hence, the measurements in terms of RSSI are very useful. The RSSI measurements together with the time information concerning when and how long time that UEs have made the measurements, may assist the gNB/eNB to detect a hidden node. Additionally, the gNB/eNB may measure a load situation of the carrier which is useful for the network to prioritize some channels for load balance and channel access failure avoidance purposes.

LTE LAA has been defined to support measurements of averaged RSSI and channel occupancy for measurement reports. The channel occupancy is defined as a percentage of time that RSSI was measured above a configured threshold. For this purpose, an RSSI Measurement Timing Configuration (RMTC) includes a measurement duration, e.g. 1-5 milliseconds (ms) and a period between measurements, e.g. {40, 80, 160, 320, 640} ms.

LBT is designed for unlicensed spectrum co-existence with other RATs. In this mechanism, a radio device applies a Clear Channel Assessment (CCA) check before any transmission. The transmitter involves energy detection (ED) over a time period compared to a certain threshold, which may be referred to as an ED threshold, in order to determine if a channel is idle. In case the channel is determined to be occupied, the transmitter performs a random back-off within a contention window before the next CCA attempt. Performing a random back-off within a contention window when used herein means that, e.g. according to the clause 4.2.1.1 in the 3GPP LTE specification 37.213, an equipment chooses a random number N uniformly distributed between 0 and a contention window, the equipment should sense the channel as idle for an additional slot duration for N times before initiating a transmission. In order to protect Acknowledgement (ACK) transmissions, the transmitter may defer a period after each busy CCA slot prior to resuming back-off. As soon as the transmitter has grasped access to a channel, the transmitter is only allowed to perform transmission up to a maximum time duration; namely, the Maximum Channel Occupancy Time (MCOT). For Quality of Service (QoS) differentiation, a channel access priority based on the service type has been defined. For example, there are four LBT priority classes defined for differentiation of Contention Window Sizes (CWS) and MCOT between services.

At 3GPP RAN1 #80, the LBT category has been defined as follows:
  Category 1: No LBT
  Category 2: LBT without random back-off
  Category 3: LBT with random back-off with fixed size of contention window
  Category 4: LBT with random back-off with variable size of contention window Channel Access Procedure for MuLteFire (MF)

In Section 14 in 3GPP TS 36.321-f00, the LBT procedures for Physical Random Access Channel (PRACH) and shortened Physical Uplink Control Channel (sPUCCH) are defined:

The UE may use type 1 channel access procedure to transmit a transmission including Scheduling Request (SR) at subframe n which is configured by higher layer signalling, if a UE does not detect Physical Downlink Control Channel (PDCCH) with Downlink Control Information (DCI) Cyclic Redundancy Check (CRC) scrambled by Common Control Radio Network Temporary Identifier (CC-RNTI) in subframe n−1. UL channel access priority class p=1 may be used for SR transmissions.

For MF, a UE shall transmit a transmission including MF-extended PUCCH (ePUCCH) on a channel on which MF transmission(s) are performed following the same channel access procedure defined for PUSCH transmission.

For MF cells, a UE may transmit a transmission including MF-sPUCCH on a channel. A UE may perform type 2 channel access procedure if MF-sPUCCH-LBT is enabled by higher layer signalling. A UE may transmit without performing channel sensing if mf-sPUCCH-LBT is not enabled by higher layer signalling. MF eNB ensures the MF-sPUCCH transmission immediately follows the preceding DL transmission within 16 us if MF-sPUCCH-LBT is set to be false.

For MF cells, a UE may transmit a transmission including PRACH on a channel on which MF transmission(s) are performed using type 2 channel access procedure if MF-PRACH-LBT is set to be true by higher layer signalling. A UE may transmit a transmission including PRACH on a channel without performing channel sensing, if MF-PRACH-LBT is set to be false by higher layer signalling.

For MF cells, when MF-PRACH-LBT is set to true, and MF-sPUCCH-LBT is set to false, the UE should perform a type 2 channel access procedure on sub frame n which is configured by higher layer signalling for PRACH transmission.

SUMMARY

An object of embodiments herein is to improve the performance of a wireless communications network.

According to an aspect of embodiments herein, the object is achieved by a method performed by a User Equipment (UE) for handling a two-step Random Access Channel (RACH) procedure, in a wireless communications network.

When a Random Access (RA) event is triggered the UE obtains a Physical Random Access Channel (PRACH) preamble corresponding to the RA event and/or a desired grant size, by randomly select a preamble mapping to an entry of a Physical Uplink Shared Channel (PUSCH) resource table, providing a required size of a PUSCH resource for the triggered RA event. The UE then obtains a grant from the PUSCH resource table based on the obtained PRACH preamble, which grant comprises an indication of a PUSCH resource to use for a Msg3 transmission in Uplink (UL).

According to another aspect of embodiments herein, the object is achieved by a method performed by a network node, for handling a two-step Random Access Channel (RACH) procedure in a wireless communications network.

The network node sends, to a User Equipment (UE) any one out of: a Physical Downlink Control Channel (PDCCH) order or a Radio Resource Control (RRC) signalling, wherein said any one out of the PDCCH order or the RRC signalling is triggering a Random Access (RA) and wherein said any one out of the PDCCH order or the RRC signalling comprises a Physical Random Access Channel (PRACH) preamble index and one or more of an indication pointing to a Physical Uplink Shared Channel (PUSCH) resource, a Modulation and Coding Scheme (MCS) and/or a power allocated for PUSCH transmissions.

The network node then receives, from the UE, a transmission comprising both a PRACH preamble and a Msg 3, wherein the PRACH preamble and Msg 3 are received in the same sub frame.

According to a further aspect of embodiments herein, the object is achieved by a User Equipment (UE) configured for handling a two-step Random Access Channel (RACH) procedure, in a wireless communications network.

When a Random Access (RA) event is triggered the UE obtains a Physical Random Access Channel (PRACH) preamble corresponding to the RA event, by randomly select a preamble adapted to map to an entry of a Physical Uplink Shared Channel (PUSCH) resource table adapted to provide a required size of a PUSCH resource for the triggered RA event. The UE then obtains a grant from the PUSCH resource table based on the obtained PRACH preamble, which grant comprises an indication of a PUSCH resource to use for a Msg3 transmission in Uplink (UL).

According to yet a further aspect of embodiments herein, the object is achieved by a network node configured for handling a two-step Random Access Channel (RACH) procedure in a wireless communications network.

The network node sends to a UE any one out of: a Physical Downlink Control Channel (PDCCH) order or a Radio Resource Control (RRC) signalling, wherein any one out of the PDCCH order and the RRC signalling is triggering a Random Access (RA) and wherein said any one out of the PDCCH order or the RRC signalling comprises a Physical Random Access Channel (PRACH) preamble index and one or more of an indication pointing to a Physical Uplink Shared Channel (PUSCH) resource, a Modulation and Coding Scheme (MCS) and/or a power allocated for PUSCH transmissions.

The network node then receives, from the UE, a transmission comprising both a PRACH preamble and a Msg 3, wherein the PRACH preamble and Msg 3 are received in the same or in subsequent sub frames.

The embodiments herein optimize performance of RA by providing an optimized latency management. The embodiments herein further increase radio connection maintenance in unlicensed spectrum. The negative impact due to LBT failure on UL data transfer and UL RACH performance is eliminated, or at least is reduced. Furthermore the occupation of PUSCH resources for two step random access is reduced. Thereby the performance of the wireless communications network is improved.

BRIEF DESCRIPTION OF THE DRAWINGS (OPTIONAL)

FIG. 1 is a signalling diagram illustrating the signalling in a legacy 4-step Random Access procedure, FIG. 2 is a flowchart depicting a the signalling in a 2-step Random Access procedure, FIG. 3 is a schematic block diagram illustrating embodiments of a wireless communications network, FIG. 4 is a flowchart depicting a method performed by the UE, FIG. 5 is a flowchart depicting a method performed by the network node, FIG. 6 is a schematic block diagram illustrating some first embodiments of a UE, FIG. 7 is a schematic block diagram illustrating some second embodiments of the UE, FIG. 8 is a schematic block diagram illustrating some first embodiments of a network node, FIG. 9 is a schematic block diagram illustrating some second embodiments of the network node, FIG. 10 is a schematic block diagram illustrating a host computer communicating via a base station with a user equipment over a partially wireless connection in accordance with some embodiments;

DETAILED DESCRIPTION

Figure 1:
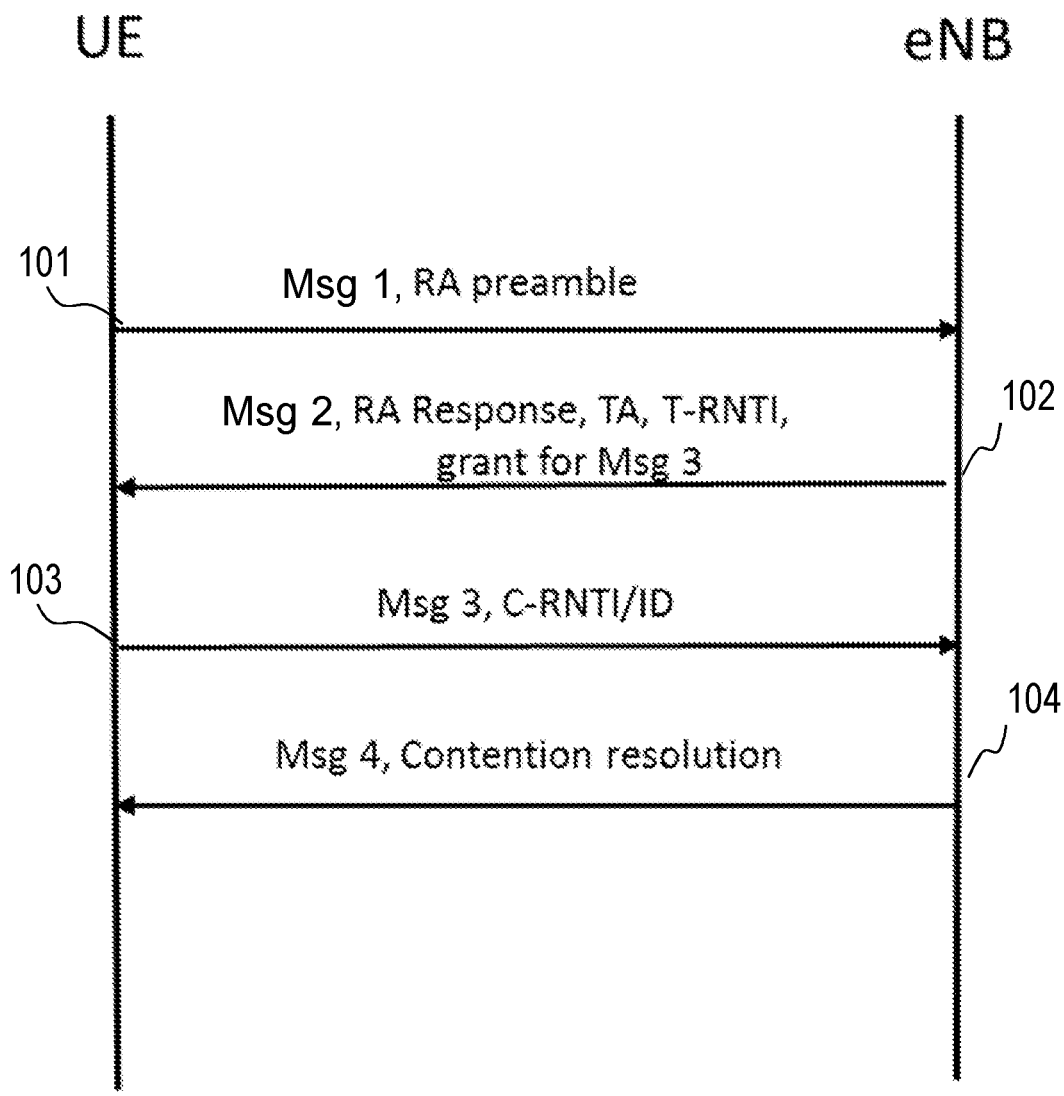

As a part of developing embodiments herein the inventors identified a problem which first will be discussed.

Next generation telecommunications systems, which may herein also be referred to as NR or 5G, are expected to support a wide range of use cases with varying requirements ranging from fully mobile devices to stationary Internet of Things (IoT) devices or fixed wireless broadband devices. The traffic pattern associated with many of the use cases is expected to comprise short or long bursts of data traffic with varying length of a waiting period in between, this waiting period may herein be referred to as an inactive state. In NR, both license assisted access and standalone unlicensed operation are to be supported in 3GPP. Hence the procedure of Physical Random Access Channel (PRACH) transmission and/or Scheduling Request (SR) transmission in unlicensed spectrum shall be investigated in 3GPP. In the following, channel sensing scheme based on Listen-before-Talk (LBT), random access procedure and LBT scheme for PRACH and short Physical Uplink Control Channel (sPUCCH) are introduced as a basis to address the solutions.

For NR unlicensed spectrum, NR standalone scenario was the newly defined scenario. For this scenario, the embodiments herein enhance the existing RACH procedure and scheduling procedure to ensure differentiated latency requirements considering the LBT impact. The embodiments disclosed herein study these issues and propose the according enhancements.

RACH Procedures in NR Unlicensed Spectrum

The legacy four-step RA has been the current standard for legacy systems such as LTE and 3GPP NR Release-15. It has been proposed to study a two-step (2-step) procedure where the Uplink (UL) messages, i.e. PRACH and Msg 3, are sent simultaneously, and similarly the two Downlink (DL) messages, e.g. Time Advance (TA) command in Random Access Response (RAR) and contention resolution information, are sent as a simultaneous response in the DL. In the legacy four-step (4-step) procedure, one of the main usages of the first two messages is to obtain UL time alignment for the UE. In many situations, e.g. in small cells or for stationary UEs, this may not be needed since either a TA=0 will be sufficient, such as e.g. for small cells, or a stored TA value from the last RA may serve also for the current RA, i.e. stationary UE. In future radio networks, such as NR 5G and later, these situations are expected to be common, both due to dense deployments of small cells and a great number of e.g. stationary IoT devices. A possibility to skip the message exchange between UE and network node, such as e.g. eNB and/or gNB, to obtain the TA value lead to reduced RA latency and may therefore be beneficial in several use cases, for example when transmitting infrequent small data packets. On the other hand, the two-step RA may consume more resources since it uses contention based transmission of the data. This means that the resources that are configured for the data may often be unused.

If both the four-step and two-step RA are configured in a cell, and for the UE, the UE may chose a preamble from one specific set if it wants to do a four-step RA, and from another set if it wants to do a two-step RA. Hence a preamble partition is done to distinguish between four-step and two-step RA.

Legacy 4-Step Random Access

The legacy 4-step RA, which is shown in FIG. 1, has been used in LTE and is also proposed as baseline for NR. The principle of this procedure is shown in FIG. 1.

Action 101: The UE randomly selects a RA preamble which is transmitted. This transmission may also be referred to as a Message 1 (Msg 1) transmission. When the eNB detects the RA preamble, it estimates the Timing Alignment (TA) the UE should use in order to obtain UL synch at the eNB.

Action 102: The eNB sends a RA response, which may also be referred to as a Message 2 (Msg 2), to the UE. The RA response comprises the TA, a Temporary-Cell Radio Network Temporary Identifier (TC-RNTI) and a grant for Message 3 (Msg 3). A TC-RNTI used by the UE to monitor PDCCH addressed to it for subsequent DL reception prior to the contention resolution has been completed.

Action 103: In Msg3, which is a UE identification message, the UE transmits its identifier (ID) and Cell (C)-RNTI. A C-RNTI when used herein is a unique identification used for e.g. identifying an RRC Connection and scheduling which is dedicated to the UE.

Action 104: The eNB responds to the Msg 3 by acknowledging the UE ID in Message 4 (Msg 4), which is a Contention resolution message. The Msg 4 gives contention resolution, i.e. only one UEs identifier will be sent even if several UEs have used the same preamble, and Msg 3, simultaneously. In LTE, the 4-step RA may not be completed in less than 14 ms/Transmission Time Interval (TTI)/subframe (SF).

2-Step Random Access

Figure 2:
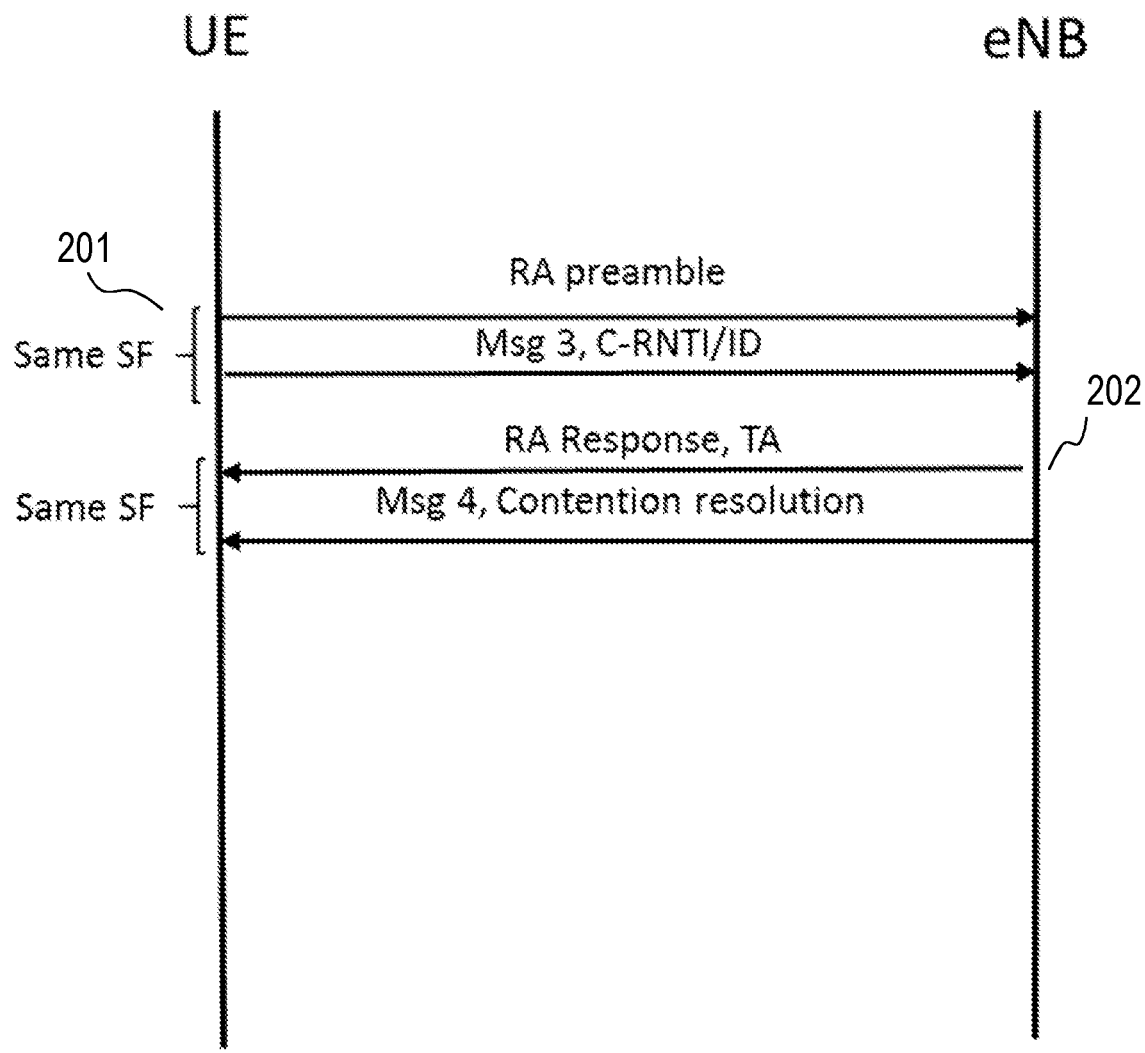

The 2-step RA, which is shown in FIG. 2, gives much shorter latency than the ordinary 4-step RA. The principle of this procedure is shown in FIG. 2.

Action 201: In the 2-step RA the preamble and a message corresponding to Msg 3 in the 4-step RA are transmitted in the same or in two subsequent sub frames. The Msg 3 is sent on a resource dedicated to the specific preamble. This means that both the preamble and the Msg 3 may face contention, which means that there may be multiple UEs performing random accesses at the same time using the same preamble or the same resource for Msg 3.

Action 202: Upon successful reception of the preamble and Msg 3, the eNB may respond with a TA, which by assumption should not be needed or just give very minor updates, and a Msg 4 for contention resolution. Contention resolution is used to address the contention in case there are multiple UEs performing random accesses at the same time using the same preamble or the same resource for Msg 3.

An issue that may occur in the 2-step RA if the UE TA is bad, such as e.g. when using TA=0 in a large cell or using an old TA even though the UE has moved, is that only the preamble may be detected by the eNB. This may be due to the fact that a transmission with an inaccurate TA value may interfere with transmissions from other UEs in the same cell. Additionally, the preamble signal has a higher detection probability than the normal data due to its design pattern. In this case the Network (NW), such as the eNB, may reply with an ordinary RAR giving the UE an opportunity to transmit an ordinary Msg 3 on a scheduled resource. This would thus lead to a fallback to the 4-step RA.

For a 2-step RACH, a typical understanding is to merge the legacy Msg 1 and Msg 3 as one message to transmit.

At 3GPP RAN2 #103, RAN2 has made the below agreements regarding 2-step RACH:

RAN2 assumes that all Random access triggers in 3GPP TS 38.300 9.2.6 may be applicable for 2-step Contention Based Random Access (CBRA).

This means that Msg 1 in 2-step RACH would cover all possible scenarios for Msg 3. Given the fact that there are various RA events, two different sizes have been defined for Msg 3 as a minimum size requirement, such as 56 bits and 72 bits for contention based random access. Additionally, a feature which may be referred to as Early Data Transmission (EDT) has been defined in LTE for Machine-Type Communication (MTC) services. With this function, some data may be included in the legacy Msg 3 transmitted by a UE during the RACH procedure. This means that the size of Msg 3 may be different, i.e. the size of Msg 3 may vary, and resources must therefore be assigned to handle the largest possible Msg 3 the UE may send. Hence, the design of resource selection for Msg 1 in 2-step RACH must consider being compatible with all possible scenarios of the legacy Msg 3.

Always providing the largest possible resource may be a waste since in many cases the resources are either not used at all, due to no random access at this time, or only part of the resource is needed, e.g. a 56 bit Msg 3 is sent but the resource allows for larger Msg 3.

In order to improve efficiency, the configured and/or predefined resources for the payload of Msg 1 in 2-step RACH must be able to provide sufficient granularity so that a UE may select resources with a most suitable size to perform transmission for Msg 1, while at the same time, there is a minimum of resources wasted due to resource overbooking.

Therefore, embodiments herein provide corresponding solutions to address the above mentioned issues.

According to some embodiments herein a resource table for Msg 1 and/or Msg 3 transmission in 2-step RACH is provided. The resource table is a general term and may, when used herein, mean a real table or e.g. a rule for access to a table using mapping rules. In this resource table, a set of PUSCH resources of different sizes may be associated with each PRACH preamble. The resource table entry may typically include the corresponding information as the grant carried in the RAR in the legacy 4-step random access. It may also include information on Hybrid Automatic Repeat Request (HARQ) process ID, and/or a radio channel quality indicator.

Upon triggering of a RA event, in other words when an RA event is triggered, the UE may randomly select a preamble mapping to a table entry, i.e. a PUSCH resource table, such as a mapping rule, providing the required size of PUSCH resource for the triggered RA event. After selecting the preamble, the UE may find, which may also be referred to as retrieve, the associated set of resources from the resource table. The selection procedure may also consider the measured radio channel quality of the UE, such as RSRP, RSRQ, or Signal to Interference and Noise Ratio (SINR) measured for the DL radio channel.

The provided embodiments are also applicable to Contention Free Random Access (CFRA) based 2-step RACH.

Figure 3:
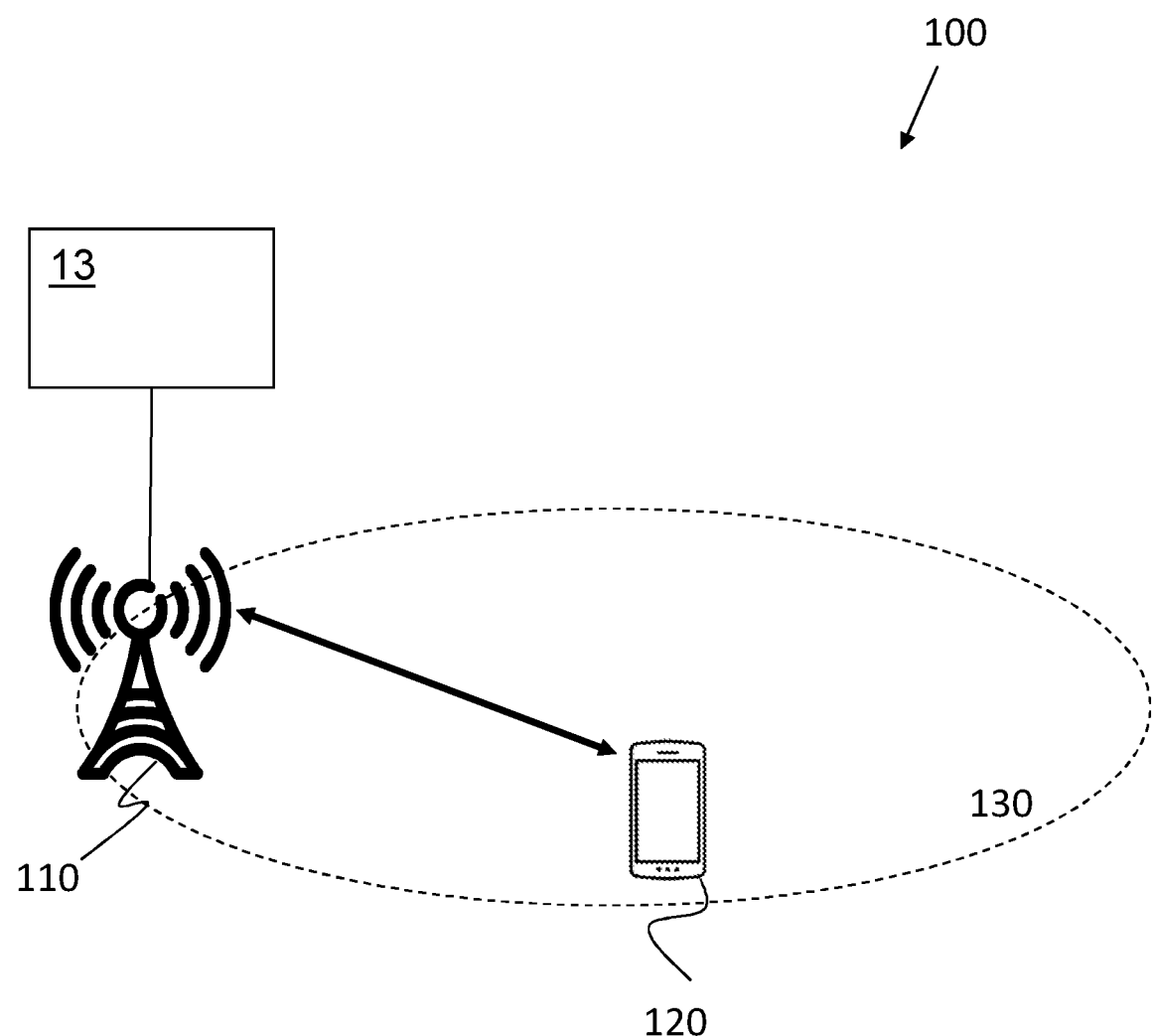

FIG. 3 illustrates a communication scenario in an exemplified wireless communication network 100, where at least some of the embodiments herein may be used. The wireless communication network 100 comprises one or more UEs 120. The UEs 120 may e.g. be mobile phones, smart phones, laptop computers, tablet computers, Machine-Type Communication (MTC) devices, mobile stations, stations (STA), or any other devices that can provide wireless communication.

Each UE 120 may thus also be referred to as a wireless device. The UE 120 may communicate via the wireless communication network 100, such as a Local Area Network (LAN), such as e.g. a Wi-Fi network, or a Radio Access Network (RAN), such as e.g. an Evolved Universal Terrestrial Radio Access Network (E-UTRAN) or a Fifth Generation (5G) RAN to a backhaul network 13, such as e.g. an Evolved Packet Core (EPC) or a 5th Generation Core (5GC). The wireless communication network 100 further comprises one or more network nodes 110, such as e.g. a radio access node e.g., a Wi-Fi access point or a radio base station (RBS), which in some networks may also be denoted, for example, a NodeB, an E-Utran NodeB (eNB), or a gNB as denoted in New Radio (NR). NR may also be referred to as 5th-Generation Wireless Systems (5G). Each of the one or more network node(s) 110 serves one or more coverage area(s) 130, which may also be referred to as e.g. a cell, a beam or a beam group. In order to determine the best available cell for the UE 120, the UE 120 may perform measurements, which may also be referred to as mobility measurements, in order to monitor and report the serving cell and neighboring cell(s) signal level and quality. The measurements may then be sent from the UE 120 to the network node 110 and may be used to assist the network node 110 to choose a suitable serving cell for the UE 120. There may be different reasons to relocate the UE 120 from a current serving cell to another cell, such as e.g. coverage reasons, traffic load level or support of a specific service.

Figure 4:
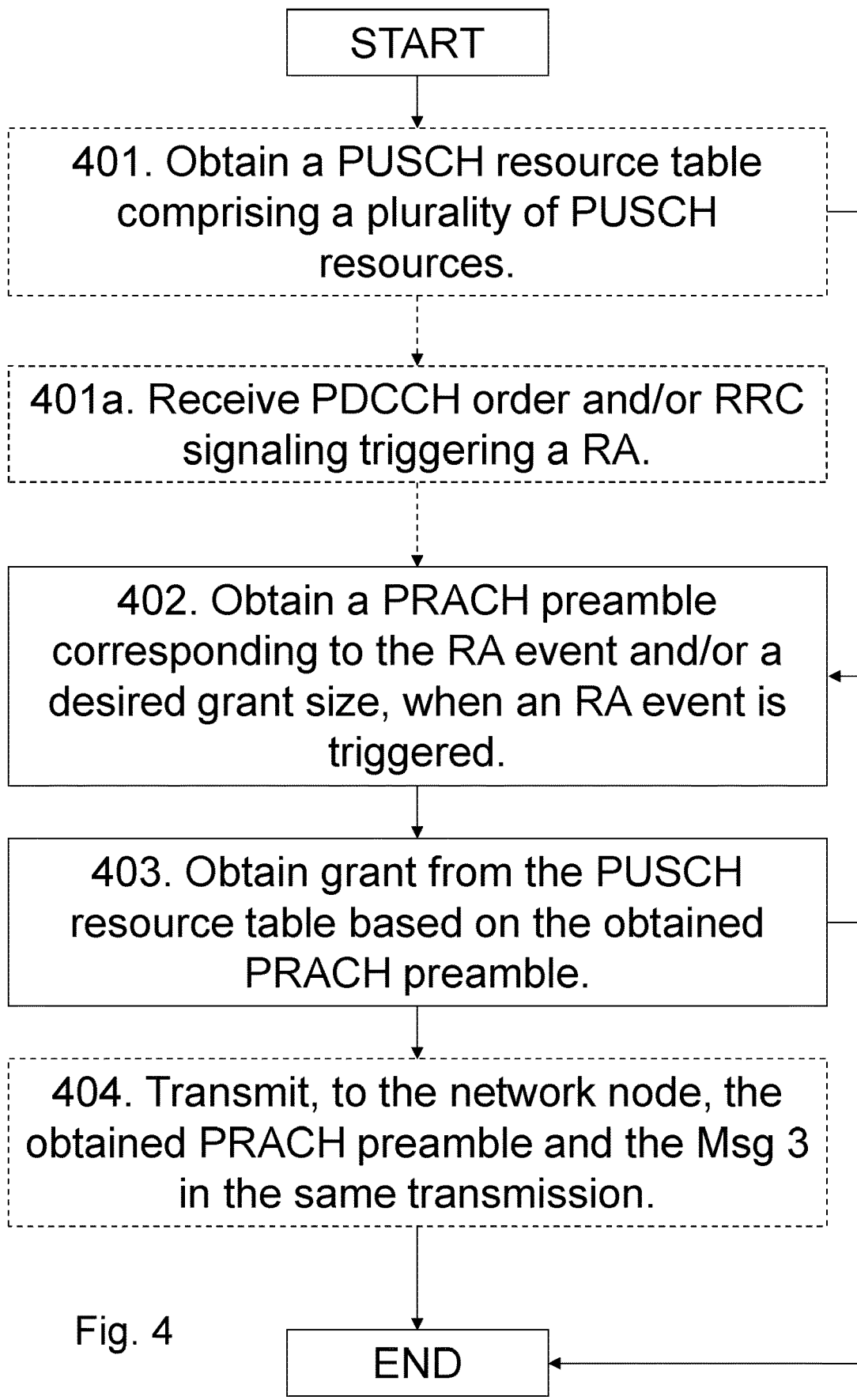

FIG. 4 illustrates the method actions performed by the UE 120, for handling a two-step Random Access Channel (RACH) procedure in the wireless communications network 100.

Action 401: The UE 120 may obtain a PUSCH resource table comprising receiving or obtaining a plurality of PUSCH resources. The obtaining of the PUSCH resource table is a general wording and may mean a table, such as e.g. table 1 below, or obtain mapping rules used to select one or multiple PUSCH resources according to specific inputs such as a specific preamble or a specific RACH occasion or a radio channel quality measurement indicator. Each PUSCH resource out of the plurality of PUSCH resources in the PUSCH resource table corresponds to a preamble assigned for the two-step RACH procedure. The resource table may e.g. be preconfigured in the UE 120 or may be received from the network node 110. The UE 120 may obtain the PUSCH resource table by receiving a PDCCH order or an RRC signalling comprising the PUSCH resource table from the network node 110 or e.g. a mapping rule to the table.

Action 401a: The UE 120 may receive a PDCCH order from the network node 110 triggering the RA event, wherein the PDCCH order comprises a PRACH preamble index and one or more of an indication pointing to the PUSCH resource, an indication pointing to an MCS scheme and/or an indication pointing to a power allocated for PUSCH transmissions. A PRACH preamble index may be used as an input to find corresponding PUSCH resources for transmission of the payload in Msg1 in the corresponding two-step RA procedure.

In a further embodiment the UE 120 may receive an RRC signalling from the network node 110 triggering the RA, wherein the RRC signalling comprises the PRACH preamble index and one or more of an indication pointing to the PUSCH resource, an indication pointing to an MCS scheme and/or an indication pointing to a power allocated for PUSCH transmissions. The indication may also be referred to as an index. An index may be used as one input to find corresponding PUSCH resources for transmission of the payload in Msg 1 in the corresponding two-step RA procedure.

Action 402: When an RA event is triggered, e.g. by receiving a trigger from the network node 110 as in Action 401a, the UE 120 obtains a PRACH preamble corresponding to the RA event and/or a desired grant size. The PRACH preamble may be obtained by randomly select a preamble mapping to the PUSCH resource table entry providing a required size of a PUSCH resource for the triggered RA event. The RA event may e.g. be triggered by the network node 110 sending a PDCCH order to the UE 120 or may be triggered by the UE 120 itself. The PRACH preamble may be selected by the UE 120, e.g. via random selection in case CBRA based RA is enabled, or the preamble may be predetermined in case CFRA is enabled. The selection may be made in a group of preambles corresponding to the RA event or the needed size of Msg 3.

Action 403: The UE 120 obtains a grant from the PUSCH resource table based on the obtained PRACH preamble. The grant may comprise an indication of a PUSCH resource to use for the Msg 3 transmission in UL. The UE 120 may obtain the PUSCH resource from the PUSCH resource table based on the indications received from the network node 110 in the PDCCH order.

Action 404: The UE 120 may transmit, to the network node 110, the obtained PRACH preamble and the Msg 3 in the same transmission. In the same transmission shall herein be interpreted as the PRACH preamble and the Msg 3 being sent in the same or in two subsequent sub frames without receiving an ACK from the network node 110 in between the transmission of the PRACH preamble and the Msg 3. Transmitting the PRACH preamble and the Msg 3 in the same transmission is advantageous as it reduces the latency to complete the RACH procedure. It is also beneficial in an unlicensed spectrum because the UE 120 may perform just one LBT operation to transmit both the preamble and the Msg 3. In this way, additional LBT operations for Msg 3 are avoided. The UE 120 may transmit the obtained PRACH preamble on a next available PRACH occasion. The PRACH occasions are usually predetermined. The UE 120 may transmit the Msg 3 on the PUSCH resource indicated by the grant obtained from the PUSCH resource table.

Figure 5:
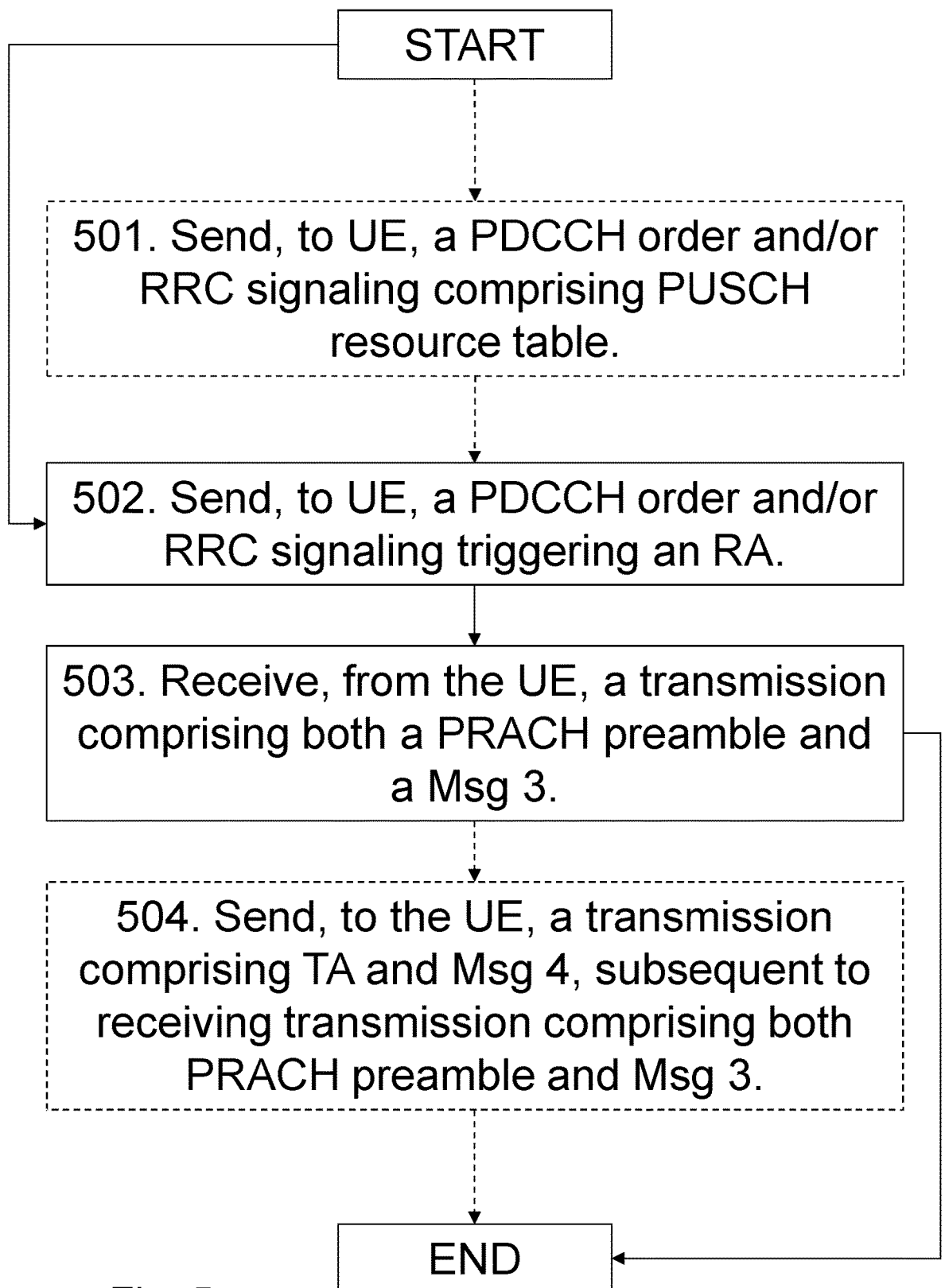

FIG. 5 illustrates the method actions performed by the network node 110, for handling the two-step RACH procedure in the wireless communications network 100.

Action 501: The network node 110 may send, to the UE 120, a PDCCH order and/or an RRC signalling comprising the PUSCH resource table to the UE 120.

Action 502: The network node 110 sends, to the UE 120, any one out of: a PDCCH order and/or an RRC signalling triggering a RA event. I.e., the network node 110 sends to the UE 120, a PDCCH order, an RRC signalling or both a PDCCH order and an RRC signalling to trigger the RA event. The PDCCH order and/or the RRC signalling comprises a PRACH preamble index and one or more of an indication pointing to the PUSCH resource, an indication pointing to an MCS scheme and/or an indication pointing to a power allocated for PUSCH transmissions.

Action 503: The network node 110 receives a transmission, from the UE 120. The transmission comprises both a PRACH preamble and a Msg 3. The PRACH preamble and Msg 3 may e.g. be received in the same or subsequent subframes.

Action 504: The network node 110 may send, to the UE 120, subsequent to receiving the transmission comprising both a PRACH preamble and a Msg 3, a transmission comprising a TA and a Msg 4 for contention resolution. The Msg 3 may be received on a PUSCH resource indicated by a grant obtained from a PUSCH resource table based on the indication sent to the UE 120.

Embodiments herein such as mentioned above will now be further described and exemplified. The text below is applicable to and may be combined with any suitable embodiment described above.

In the following, various embodiments for selection of PUSCH resources for Msg 1 in 2-step RACH will be elaborated.

According to an embodiment, a PUSCH resource table comprising a list of PUSCH resources may be preconfigured for every preamble that is assigned for the 2-step RACH procedure wherein the table, each PUSCH resource entry in the table is associated with at least one of the below characteristics:

A PRACH preamble index

Indices for associated cells, Bandwidth Parts (BWPs), or channels

A specific RA event or a group of RA events or a needed PUSCH resource size,

A size of the grant, such as e.g. transport block size, for the corresponding PUSCH transmission A time period that the grant is valid since the PUSCH transmission starts One or multiple HARQ process IDs that are associated with the corresponding PUSCH transmissions One or several Mission Critical Services (MCS) choices, multiple MCS options in case the UE 120 performs multiple-slot transmission, so for each slot, a specific MCS can be applied One or several power allocations for the corresponding PUSCH transmissions Maximum times allowed for HARQ retransmissions Reliability requirements associated with the corresponding PUSCH transmissions Associated radio channel quality measurement/indicator region, this may be used for link adaptation, the UE 120 selects the suitable Transport Format Set (TFS).

The resource table may be preconfigured via either system information signalling or may be hard coded in the specification. The resource table may be cell, BWP, and/or channel specific. So, the system may adjust the resource settings depending on the load statistics and/or channel occupancy statistics.

According to a further embodiment, upon triggering of a specific RA event, the UE 120 may select the PRACH preamble, e.g. via random selection in case Contention Based Random Access (CBRA) based RA is enabled, or the preamble may be predetermined in case CFRA is enabled. The selection may be made in a group of preambles corresponding to the RA event or the needed size of Msg 3.

Based on the selected preamble, the UE 120 may look up the corresponding grant in the resource table. The grant in the table may have the same or similar form as the grant in the ordinary RAR message shown in Table 1.

TABLE 1

| Grant field in RAR message from 38.273 Table 8.2-1: Random Access Response Grant Content field size ||
|---|---|
| RAR grant field | Number of bits |
| Frequency hopping flag | 1 |
| Msg 3 PUSCH frequency resource allocation | 14 |

TABLE 1-continued

| Grant field in RAR message from 38.273 Table 8.2-1: Random Access Response Grant Content field size ||
|---|---|
| RAR grant field | Number of bits |
| Msg 3 PUSCH time resource allocation | 4 |
| MCS | 4 |
| TPC command for Msg 3 PUSCH | 3 |
| CSI request | 1 |

Depending on the triggering condition or needed Msg 3 size, the grant corresponding to different preambles may be of different size and have different frequency and time allocations. The grant indicates the PUSCH resource to use, by the UE 120, for the Msg 3 part in the UL transmission in the 2-step RACH procedure. The preamble is transmitted on the next available PRACH occasion.

Example

1. RA triggered
2. Randomly select preamble from preamble pool corresponding to triggering event, e.g. Initial access: preamble 1-4, Regain UL synchronization: preamble 5-6, Beam failure recovery: preamble 7-9. This step is similar to Action 402 described above in relation to FIG. 4.
3. Read table entry corresponding to selected preamble to obtain grant of suitable size. This step is similar to Action 403 described above in relation to FIG. 4.
4. Transmit selected preamble on next available PRACH occasion and Msg 3 on the PUSCH resource indicated by the grant obtained from the table. This step is similar to Action 404 described above in relation to FIG. 4.

According to a further embodiment, upon triggering of a RA event in RRC_INACTIVE or RRC_CONNECTED, the UE 120 may have both the preconfigured resources tables and configured grant available for the Msg 1 transmission. The triggering of the RA event in RRC_INACTIVE or RRC_CONNECTED may e.g. be performed by the UE 120 or by the network node 110 by sending RRC signalling to the UE 120. The UE 120 may determine either a PUSCH resource from the preconfigured resource table or a resource from the configured grant based on certain criteria, for example, based on a check on which resource is more suitable to fulfil the service QoS for the data that triggers the RACH, in terms of latency or transmission reliability requirement. The UE 120 may choose to use another resource, such as e.g., configured grant instead of preconfigured resource in the resource table, for subsequent HARQ retransmissions if the UE 120 experiences a collision for the initial/previous transmission with the resource selected from the preconfigured table. Similarly, the UE 120 may choose to use a resource selected from the predefined table for subsequent HARQ retransmissions in case the UE 120 experiences a collision for the initial/previous HARQ transmission with a configured grant.

According to a further embodiment, in case a RA is triggered by a PDCCH order, in addition to comprising a PRACH preamble index, the order may also carry other information such as indices pointing to the PUSCH resources, optional MCS scheme, optional power allocated for PUSCH transmission in Msg 1. The UE 120 may obtain the resources from the table with the indices as inputs. In another option, the order may carry explicit information on the PUSCH resources instead of indices. The order may also convey indices for associated cells, BWPs, or channels where the PRACH transmission may occur. The UE 120 may use the resources for the corresponding PUSCH transmission in a two-step RACH procedure.

Figure 6:
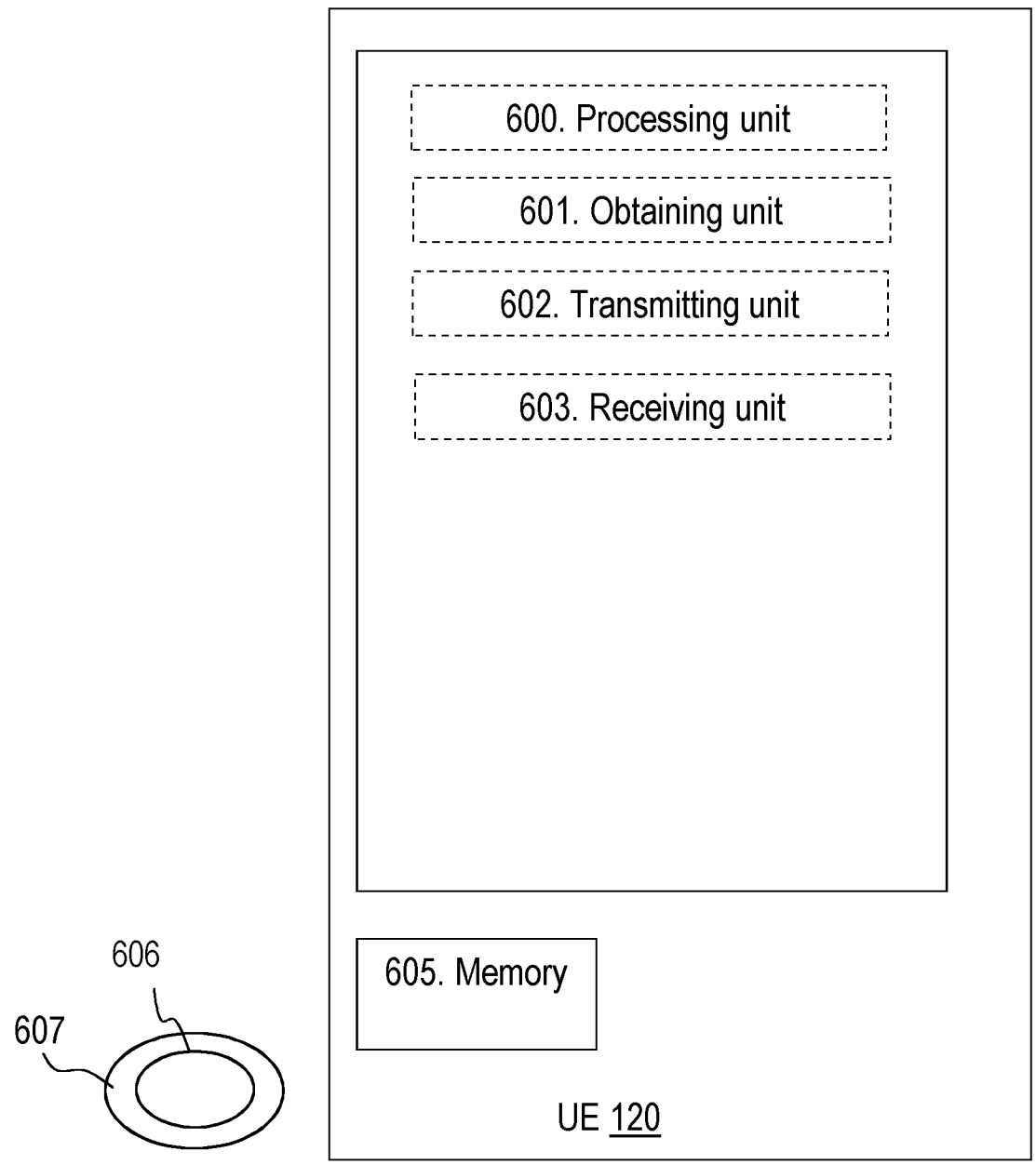

FIG. 6 is a block diagram depicting the UE 120, for handling a two-step Random Access Channel (RACH) procedure, in a wireless communications network 100. The UE 120 may comprise a processing unit 600, e.g. one or more processors such as the processor 608, an obtaining unit 601, a transmitting unit 602 and/or a receiving unit 603 as exemplifying hardware units configured to perform the method as described herein for the UE 120.

The UE 120 may be configured to, e.g. by means of the processing unit 600 and/or the obtaining unit 601 being configured to, obtain a Physical Uplink Shared Channel (PUSCH) resource table comprising a plurality of PUSCH resources. Each PUSCH resource out of the plurality of PUSCH resources corresponds to a preamble assigned for the two-step RACH procedure.

The UE 120 may be configured to, e.g. by means of the processing unit 600 and/or the obtaining unit 601 being configured to, obtain the PUSCH resource table by receiving a Physical Downlink Control Channel (PDCCH) order and/or an RRC signalling comprising the PUSCH resource table from the network node 110.

The UE 120 is further configured to, e.g. by means of the processing unit 600 and/or the obtaining unit 601, being configured to, when a Random Access (RA) event is triggered, obtain a Physical Random Access Channel (PRACH) preamble corresponding to the RA event, e.g. by randomly select a preamble adapted to map to an entry of a Physical Uplink Shared Channel, PUSCH resource table, adapted to provide a required size of a PUSCH resource for the triggered RA event.

The UE 120 is further configured to, e.g. by means of the processing unit 600 and/or the obtaining unit 601 being configured to, obtain a grant from the PUSCH resource table based on the obtained PRACH preamble, which grant comprises an indication of a PUSCH resource to use for a Msg 3 transmission in UL.

The UE 120 may further be configured to, e.g. by means of the processing unit 600 and/or the transmitting unit 602 being configured to, transmit to the network node 110, the obtained PRACH preamble and the Msg 3 in the same transmission.

The UE 120 may further be configured to, e.g. by means of the processing unit 600 and/or the transmitting unit 602 being configured to, transmit to the network node 110, the obtained PRACH preamble on a next available PRACH occasion.

The UE 120 may further be configured to, e.g. by means of the processing unit 600 and/or the transmitting unit 602 being configured to, transmit the Msg 3 on the PUSCH resource indicated by the grant obtained from the PUSCH resource table.

The UE 120 may further be configured to, e.g. by means of the processing unit 600 and/or the receiving unit 603 being configured to, receive a PDCCH order from a network node triggering the RA, wherein the PDCCH order comprises a PRACH preamble index and one or more of an indication pointing to the PUSCH resource, an MCS scheme and/or a power allocated for PUSCH transmissions.

The UE 120 may further be configured to, e.g. by means of the processing unit 600 and/or the receiving unit 603 being configured to, receive an RRC signalling from a network node triggering the RA, wherein the RRC signalling comprises a PRACH preamble index and one or more of an indication pointing to the PUSCH resource, an MCS scheme and/or a power allocated for PUSCH transmissions.

The UE 120 may further be configured to, e.g. by means of the processing unit 600 and/or the obtaining unit 601 being configured to, obtain the PUSCH resource from the PUSCH resource table based on the received indications.

Figure 7:
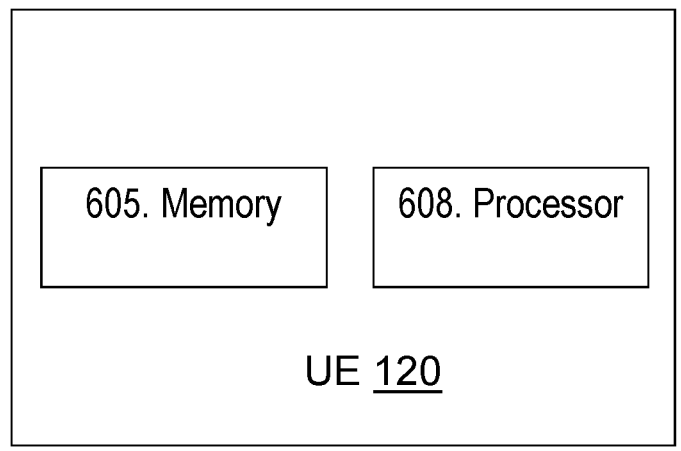
Figure 7:
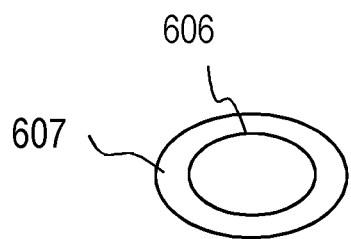

The embodiments herein may be implemented through a respective processor, such as the processor 608, or one or more processors of a processing circuitry in the UE 120 as depicted in FIG. 7, which processing circuitry is configured to perform the method actions according to FIG. 4 and the embodiments described above for the UE 120.

The embodiments may be performed by the processor 608 together with respective computer program code for performing the functions and actions of the embodiments herein. The program code mentioned above may also be provided as a computer program product 606, for instance in the form of a data carrier 607 carrying computer program code for performing the embodiments herein when being loaded into the UE 120. One such carrier 607 may be in the form of a CD ROM disc. It is however feasible with other data carriers such as e.g. a memory stick. The computer program code may furthermore be provided as pure program code on a server and downloaded to the UE 120.

The UE 120 may further comprise a memory 605. The memory 605 may comprise one or more memory units to be used to store data on, such as the PUSCH resource table, software, patches, system information (SI), configurations, diagnostic data, performance data and/or applications to perform the methods disclosed herein when being executed, and similar.

The method according to the embodiments described herein for the UE 120 may be implemented by means of e.g. a computer program product 606 or a computer program, comprising instructions, i.e., software code portions, which, when executed on at least one processor, such as the processor 608, cause at least one processor to carry out the actions described herein, as performed by the UE 120. The computer program product 606 may be stored on a computer-readable storage medium, e.g. a disc or similar. The computer-readable storage medium, having stored thereon the computer program, may comprise instructions which, when executed on at least one processor, cause the at least one processor to carry out the actions described herein, as performed by the UE 120. In some embodiments, the computer-readable storage medium may be a non-transitory computer-readable storage medium. The computer program may also be comprised on a carrier, such as the carrier 607, wherein the carrier 607 is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Figure 8:
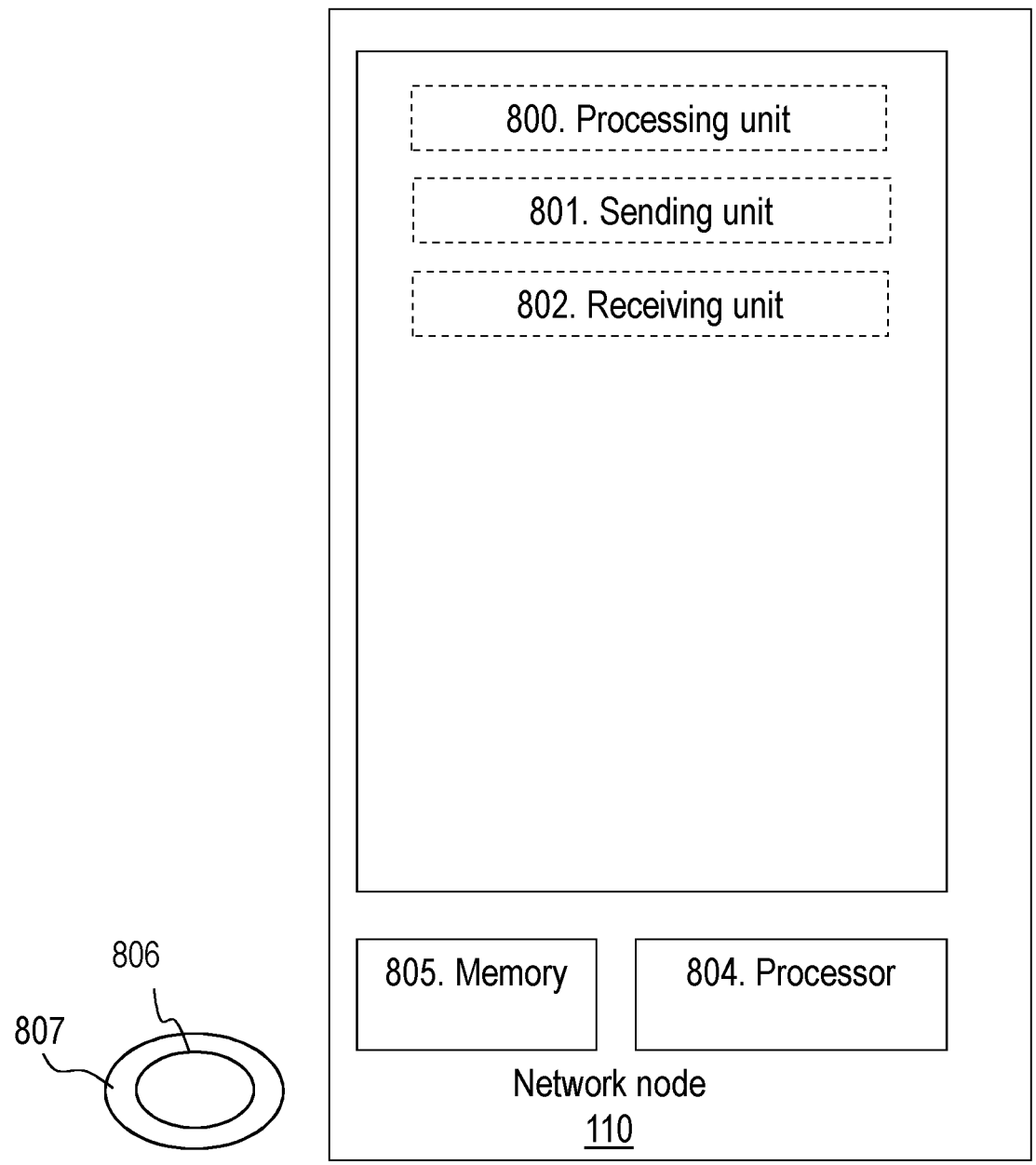

FIG. 8 is a block diagram depicting the network node 110, such as e.g. an eNB or a gNB, for handling a two-step RACH procedure in a wireless communications network 100. The network node 110 may comprise a processing unit 800, such as e.g. one or more processors, a sending unit 801, and/or a receiving unit 802 as exemplifying hardware units configured to perform the method as described herein for the network node 110.

The network node 110 may be configured to, e.g. by means of the processing unit 800 and/or the sending unit 801 being configured to, send to a UE 120, a PDCCH order and/or an RRC signalling comprising the PUSCH resource table.

The network node 110 is configured to, e.g. by means of the processing unit 800 and/or the sending unit 801 being configured to, send to a UE 120, any one out of: a Physical Downlink Control Channel (PDCCH) order and/or an Radio Resource Control (RRC) signalling wherein any one out of the PDCCH order and the RRC signalling is triggering a Random Access (RA), and wherein said any one out of the PDCCH order or the RRC signalling may comprise a Physical Random Access Channel (PRACH) preamble index and one or more of an indication pointing to the PUSCH resource, an MCS scheme and/or a power allocated for PUSCH transmissions.

The network node 110 is configured to, e.g. by means of the processing unit 800 and/or the receiving unit 802 being configured to, receive from the UE 120, a transmission comprising both a PRACH preamble and a Msg 3. The PRACH preamble and Msg 3 may e.g. be received in the same sub frame.

The network node 110 may be configured to, e.g. by means of the processing unit 800 and/or the sending unit 801 being configured to, send to the UE 120, subsequent to receiving the transmission comprising both a PRACH preamble and a Msg 3, a transmission comprising a Timing Advance (TA) and a Msg 4 for contention resolution.

The network node 110 may be configured to, e.g. by means of the processing unit 800 and/or the receiving unit 802 being configured to, receive the Msg3 on a PUSCH resource indicated by a grant obtained from a PUSCH resource table based on the indication sent to the UE 120.

Figure 9:
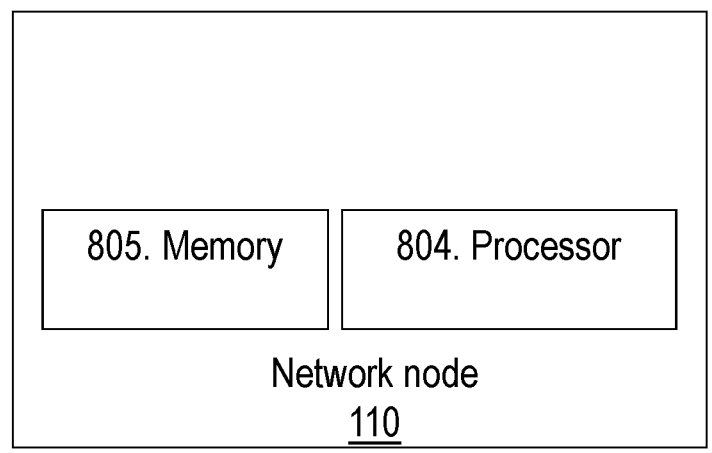
Figure 9:
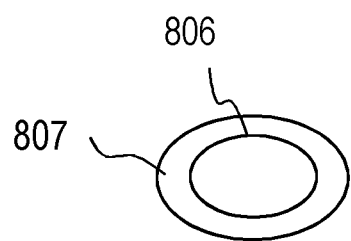

The embodiments herein may be implemented through a respective processor or one or more processors of a processing circuitry in the network node 110 as depicted in FIG. 9, which processing circuitry is configured to perform the method actions according to FIG. 5 and the embodiments described above for the network node 110.

The embodiments may be performed by the processor 804 together with respective computer program code for performing the functions and actions of the embodiments herein. The program code mentioned above may also be provided as a computer program product 806, for instance in the form of a data carrier 807 carrying computer program code for performing the embodiments herein when being loaded into the network node 110. One such carrier may be in the form of a CD ROM disc. It is however feasible with other data carriers such as e.g. a memory stick. The computer program code may furthermore be provided as pure program code on a server and downloaded to the network node 110.

The network node 110 may further comprise a memory 805. The memory 805 may comprise one or more memory units to be used to store data on, such as software, patches, system information, configurations, diagnostic data, performance data and/or applications to perform the methods disclosed herein when being executed, and similar.

The method according to the embodiments described herein for the network node 110 may be implemented by means of e.g. a computer program product 806 or a computer program, comprising instructions, i.e., software code portions, which, when executed on at least one processor, such as the processor 804, cause at least one processor to carry out the actions described herein, as performed by the network node 110. The computer program product 806 may be stored on a computer-readable storage medium, e.g. a disc or similar. The computer-readable storage medium having stored thereon the computer program, may comprise instructions which, when executed on at least one processor, cause the at least one processor to carry out the actions described herein, as performed by the network node 110. In some embodiments, the computer-readable storage medium may be a non-transitory computer-readable storage medium. The computer program may also be comprised on a carrier 807, wherein the carrier 807 is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

The network node 110, described in the embodiments herein may also be implemented in a cloud. Although the method actions performed by the network node 110 herein are discussed in the context of a radio network node, the method may also be performed by a core network node or a distributed node comprised in a first cloud, such as e.g. a server and/or a datacenter. The method actions may e.g. be performed by a logical function, which may be a centralized service hosted on the core network node or the distributed node.

It shall be noted that the nodes mentioned herein may be arranged as separate nodes or may be collocated within one or more nodes in the communications network. When a plurality of nodes are collocated in one node, the single node may be configured to perform the actions of each of the collocated nodes.

Further Extensions and Variations

Figure 10:
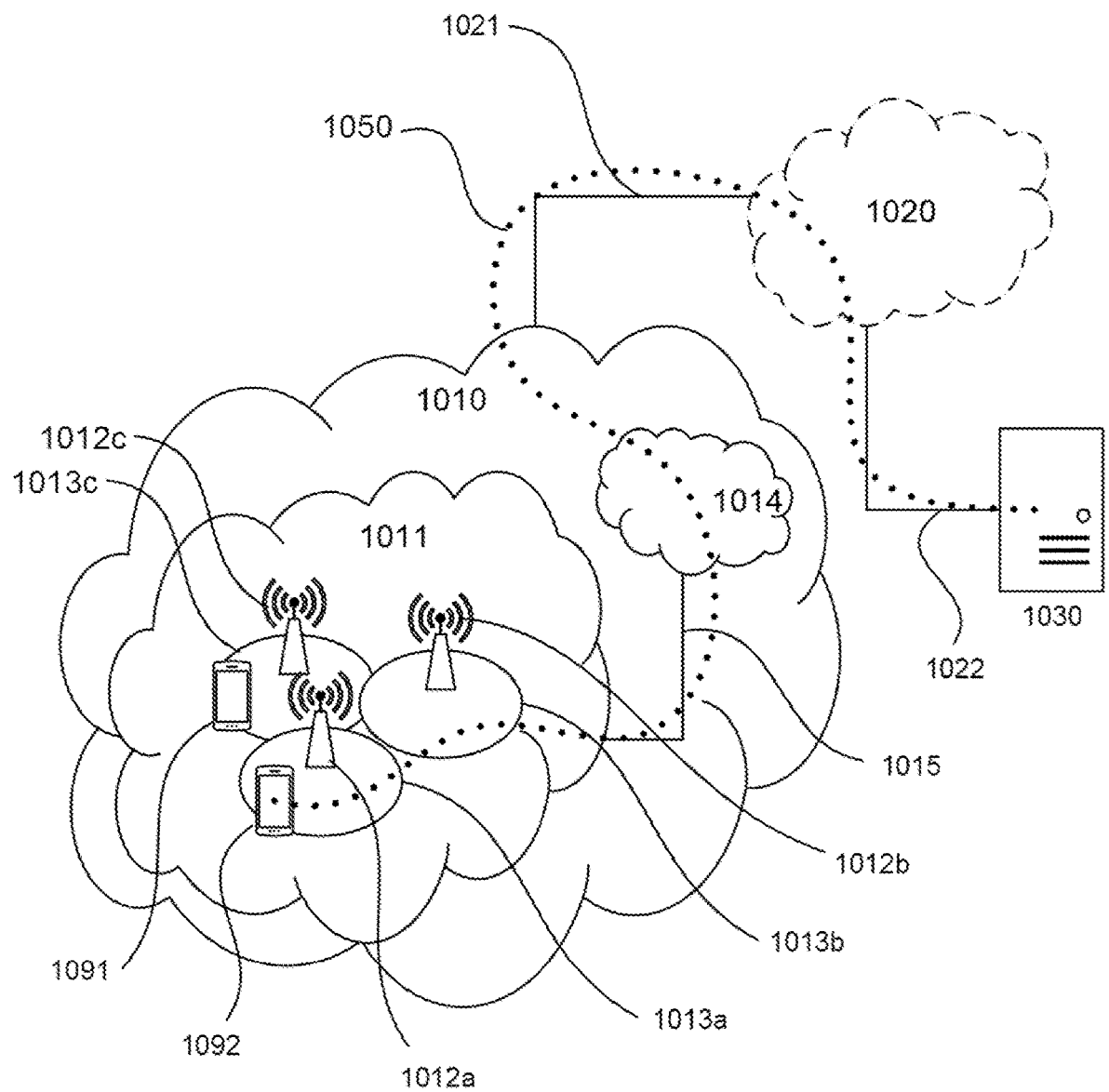

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, e.g. the network node 110, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091, such as the UE 120, located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signalling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink (UL) and downlink (DL) communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 13) served by base station 1120. Communication interface 1126 may be configured to facilitate connection 1160 to host computer 1110. Connection 1160 may be direct or it may pass through a core network (not shown in FIG. 13) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
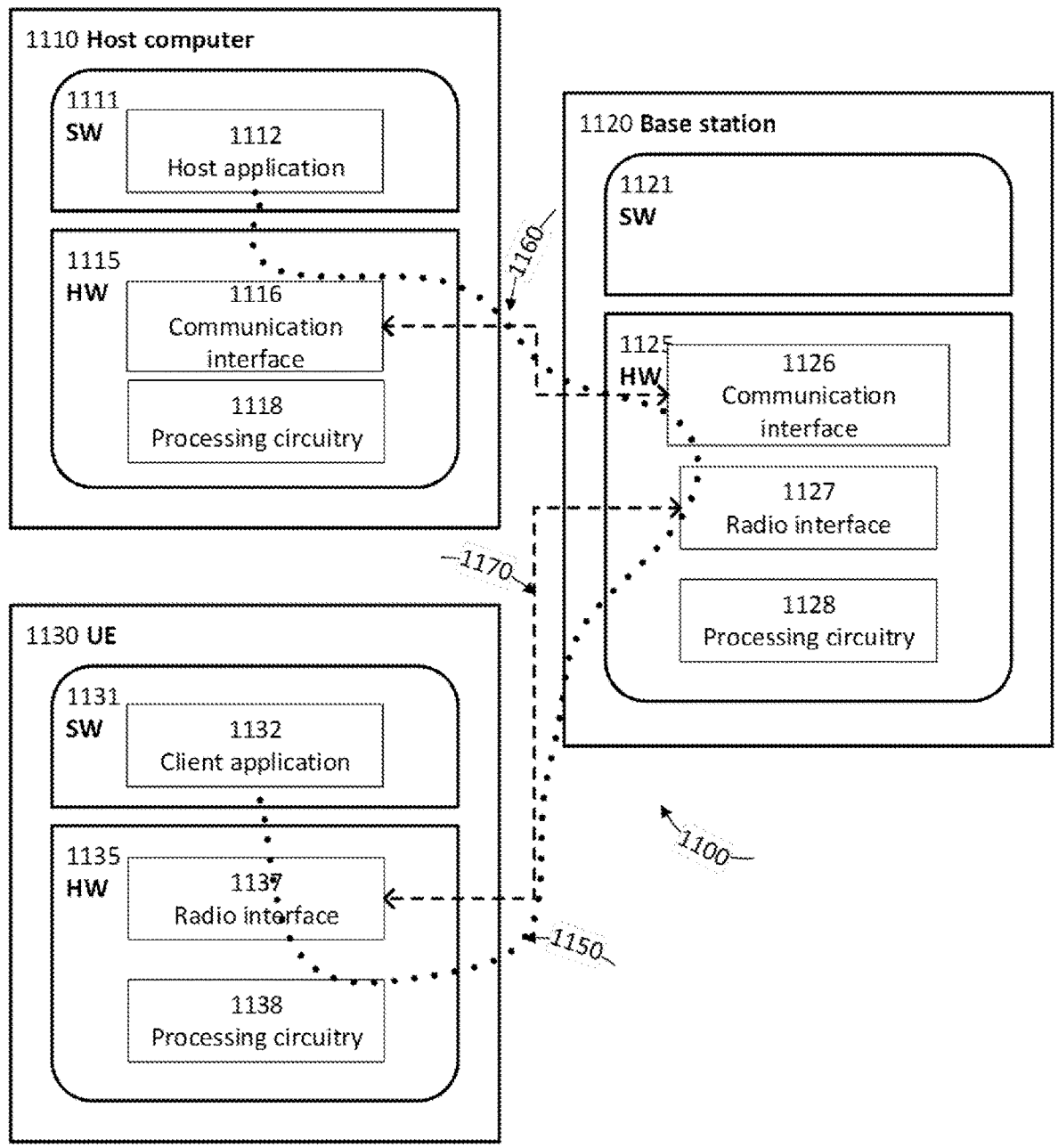
FIG. 11 is a schematic overview of a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may reduce the RA latency and thereby provide benefits such as improved performance of the communications network, in particular when transmitting infrequent small data packets.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signalling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figures 12, 13:
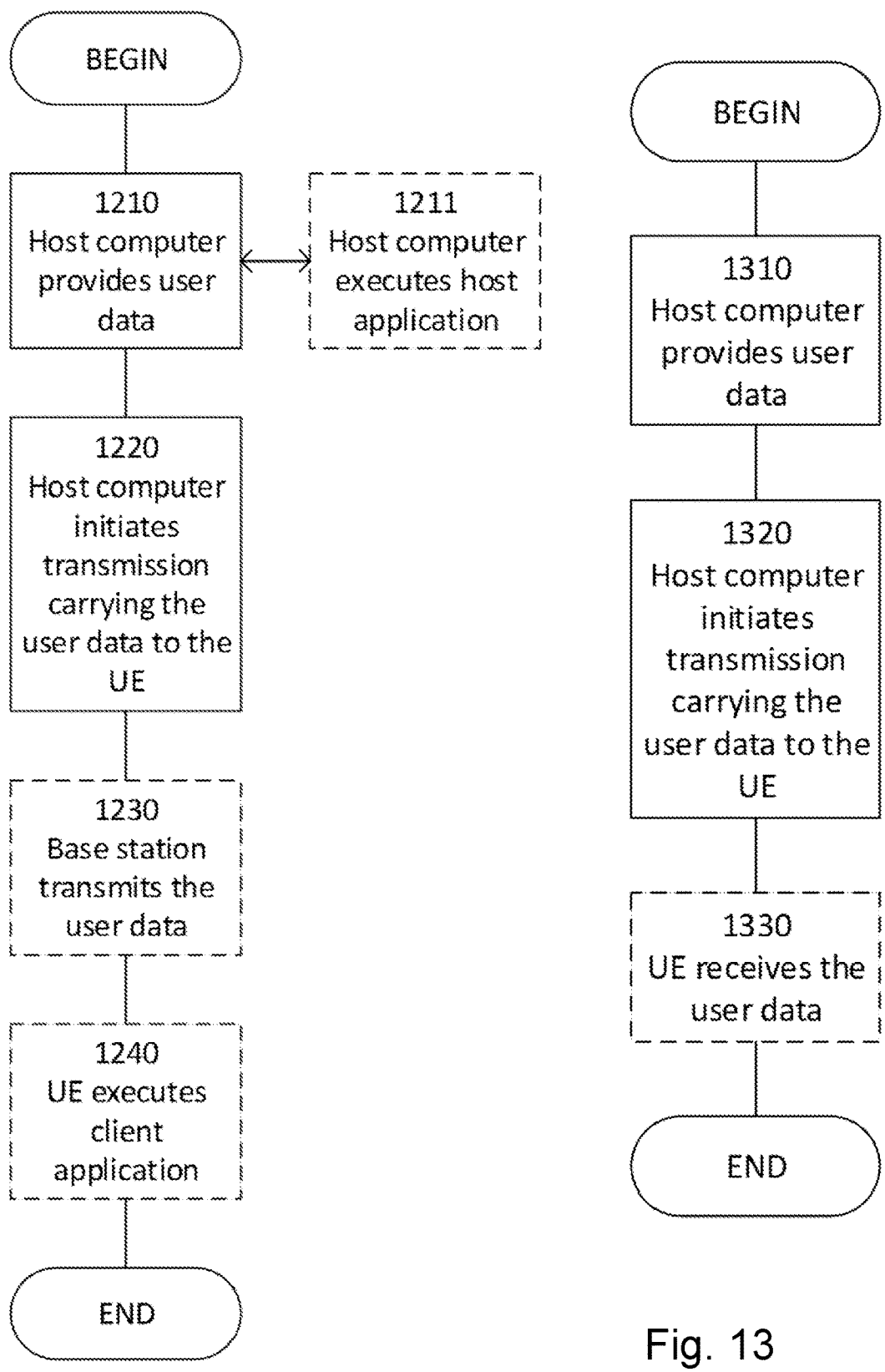
FIG. 12 is a flowchart depicting methods implemented in a communication system including a host computer, a base station and a user equipment in accordance with some embodiments.
FIG. 13 is a flowchart depicting methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 14, 15:
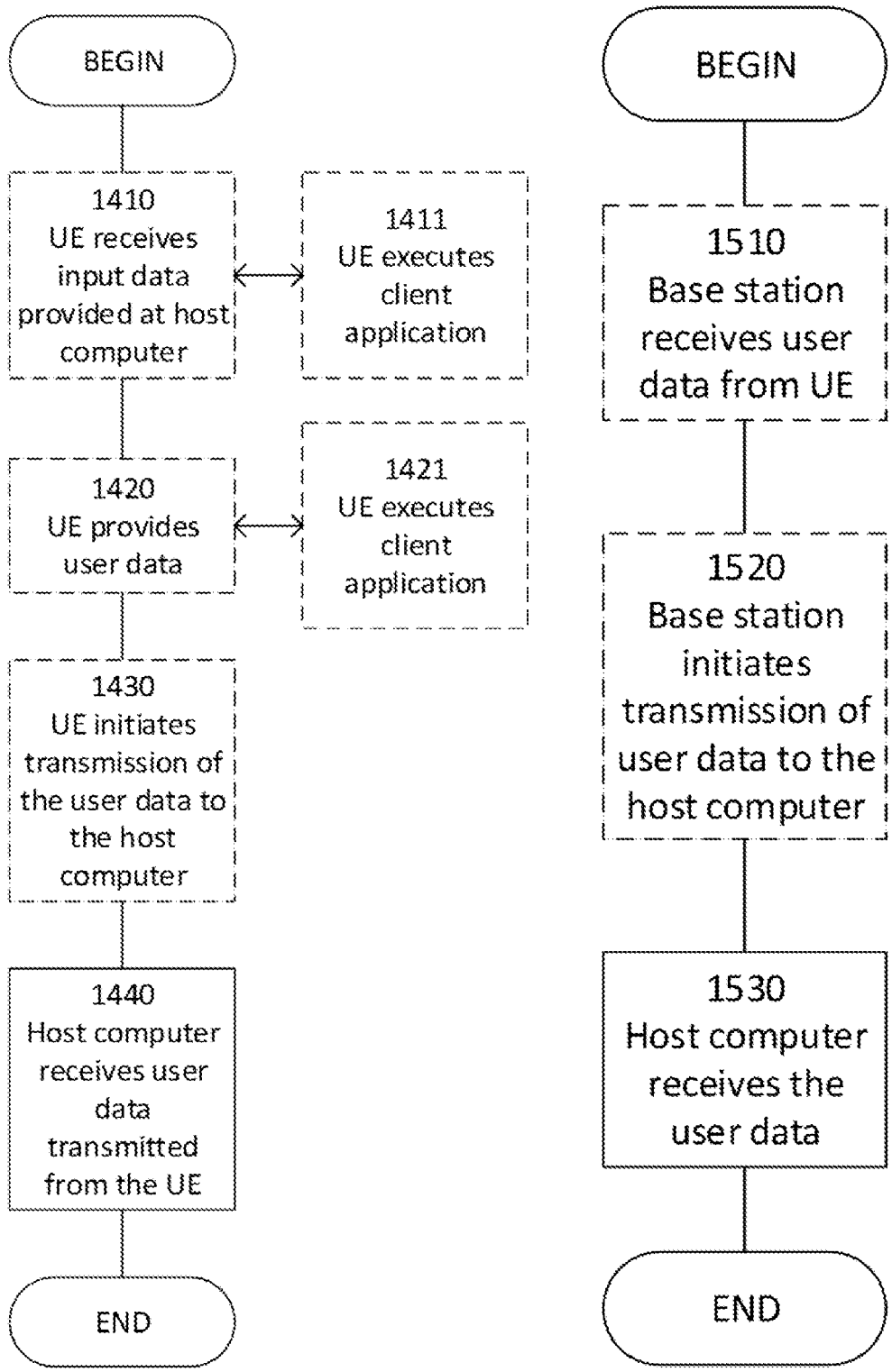
FIG. 14 is a flowchart depicting methods implemented in a communication system including a host computer, a base station and a user equipment in accordance with some embodiments.
FIG. 15 is a flowchart depicting methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Below, some example embodiments 1-26 are described.

Embodiment 1. A method, performed by a UE (120), for handling a two-step Random Access Channel, RACH, procedure, in a wireless communications network, the method comprising:

obtaining (401) a PUSCH resource table comprising a plurality of PUSCH resources, wherein each PUSCH resource out of the plurality of PUSCH resources corresponds to a preamble assigned for the two-step RACH procedure, and when a Random Access, RA, event is triggered:

obtaining (402) a PRACH preamble corresponding to the Random Access (RA) event and/or a desired grant size, obtaining (403) a grant from the PUSCH resource table based on the obtained PRACH preamble, which grant comprises an indication of a PUSCH resource to use for a Msg3 transmission in Uplink, UL.

Embodiment 2. The method according to Embodiment 1, wherein the method further comprises:

transmitting (404), to a network node ( ) the obtained PRACH preamble and a Msg 3 in the same transmission.

Embodiment 3. The method according to Embodiment 1 or 2, wherein the step of transmitting (404) further comprises:

transmitting, to the network node (110), the obtained PRACH preamble on a next available PRACH occasion. The PRACH occasions may be predetermined.

Embodiment 4. The method according to any of the Embodiments 1 to 3, wherein the step of transmitting (404) further comprises:

transmitting the Msg 3 on the PUSCH resource indicated by the grant obtained from the PUSCH resource table.

Embodiment 5. The method according to any of the previous Embodiments, wherein the step of obtaining the PRACH preamble (402) further comprises:

receiving a PDCCH order from a network node triggering the RA, wherein the PDCCH order comprises a PRACH preamble index and one or more of an indication pointing to the PUSCH resource, an MCS scheme and/or a power allocated for PUSCH transmissions, and wherein the step of obtaining the grant from the PUSCH resource table (403) further comprises:

obtaining the PUSCH resource from the PUSCH resource table based on the received indications.

Embodiment 6. The method according to any of the previous Embodiments 1 to 4, wherein the step of obtaining the PRACH preamble (402) further comprises:

receiving an RRC signalling from a network node triggering the RA, wherein the RRC signalling comprises a PRACH preamble index and one or more of an indication pointing to the PUSCH resource, an MCS scheme and/or a power allocated for PUSCH transmissions, and wherein the step of obtaining the grant from the PUSCH resource table (403) further comprises:

obtaining the PUSCH resource from the PUSCH resource table based on the received indications.

Embodiment 7. A computer program comprising instructions, which when executed by a processor, causes the processor to perform actions according to any of the Embodiments 1-6.

Embodiment 8. A carrier comprising the computer program of Embodiment 7, wherein the carrier is one of an electronic signal, an optical signal, an electromagnetic signal, a magnetic signal, an electric signal, a radio signal, a microwave signal, or a computer-readable storage medium.

Embodiment 9. A method performed by a network node (110), for handling a two-step Random Access Channel, RACH, procedure in a wireless communications network (100), the method comprising:

sending (502), to a user equipment, UE, (120), a PDCCH order triggering a RA, wherein the PDCCH order comprises a PRACH preamble index and one or more of an indication pointing to the PUSCH resource, an MCS scheme and/or a power allocated for PUSCH transmissions, receiving (503), from the UE (120), a transmission comprising both a PRACH preamble and a Msg 3. The PRACH preamble and Msg 3 may e.g. be received in the same sub frame.

Embodiment 10. A method performed by a network node (110), for handling a two-step Random Access Channel, RACH, procedure in a wireless communications network (100), the method comprising:

sending (502), to a user equipment, UE, (120), an RRC signalling triggering a RA, wherein the RRC signalling comprises a PRACH preamble index and one or more of an indication pointing to the PUSCH resource, an MCS scheme and/or a power allocated for PUSCH transmissions, receiving (503), from the UE (120), a transmission comprising both a PRACH preamble and a Msg 3. The PRACH preamble and Msg 3 may e.g. be received in the same sub frame.

Embodiment 11. The method according to Embodiment 9 or 10, wherein the method further comprises:

sending (504), to the UE (120), subsequent to receiving the transmission comprising both a PRACH preamble and a Msg 3, a transmission comprising a timing advance (TA) and a Msg 4 for contention resolution.

Embodiment 12. The method according to any of the embodiments 9 to 11, wherein the Msg3 is received on a PUSCH resource indicated by a grant obtained from a PUSCH resource table based on the indication sent to the UE (120).

Embodiment 13. A computer program comprising instructions, which when executed by a processor, causes the processor to perform actions according to any of the Embodiments 9-12.

Embodiment 14. A carrier comprising the computer program of Embodiment 13, wherein the carrier is one of an electronic signal, an optical signal, an electromagnetic signal, a magnetic signal, an electric signal, a radio signal, a microwave signal, or a computer-readable storage medium.

Embodiment 15. A UE (120), for handling a two-step Random Access Channel, RACH, procedure, in a wireless communications network (100), wherein the UE (120) is configured to:

obtain, e.g. by means of an obtaining unit, a PUSCH resource table comprising a plurality of PUSCH resources, wherein each PUSCH resource out of the plurality of PUSCH resources corresponds to a preamble assigned for the two-step RACH procedure, and when a Random Access, RA, event is triggered:

obtain, e.g. by means of an obtaining unit, a PRACH preamble corresponding to the RA event, obtain, e.g. by means of an obtaining unit, a grant from the PUSCH resource table based on the obtained PRACH preamble, which grant comprises an indication of a PUSCH resource to use for a Msg3 transmission in Uplink, UL.

Embodiment 16. The UE (120) according to Embodiment 15, wherein the UE (120) further is configured to:

transmit to a network node (110), e.g. by means of a transmitting unit, the obtained PRACH preamble and a Msg 3 in the same transmission.

Embodiment 17. The method according to Embodiment 15 or 16, wherein the UE (120) further is configured to:

transmit to the network node (110), e.g. by means of a transmitting unit, the obtained PRACH preamble on a next available PRACH occasion.

Embodiment 18. The UE (120) according to any of the Embodiments 15 to 17, wherein the UE (120) further is configured to:

transmit, e.g. by means of a transmitting unit, the Msg 3 on the PUSCH resource indicated by the grant obtained from the PUSCH resource table.

Embodiment 19. The UE (120) according to any of the Embodiments 15 to 18, wherein the UE (120) further is configured to:

receive, e.g. by means of a receiving unit, a PDCCH order from a network node triggering the RA, wherein the PDCCH order comprises a PRACH preamble index and one or more of an indication pointing to the PUSCH resource, an indication pointing to an MCS scheme and/or an indication pointing to a power allocated for PUSCH transmissions, obtain, e.g. by means of an obtaining unit, the PUSCH resource from the PUSCH resource table based on the received indications.

Embodiment 20. The UE (120) according to any of the Embodiments 15 to 18, wherein the UE (120) further is configured to:

receive, e.g. by means of a receiving unit, an RRC signalling from a network node triggering the RA, wherein the RRC signalling comprises a PRACH preamble index and one or more of an indication pointing to the PUSCH resource, an indication pointing to an MCS scheme and/or an indication pointing to a power allocated for PUSCH transmissions, obtain, e.g. by means of an obtaining unit, the PUSCH resource from the PUSCH resource table based on the received indications.

Embodiment 21. A network node (110), such as e.g. an eNB or an gNB, for handling a two-step Random Access Channel, RACH, procedure in a wireless communications network (100), the network node (110) being configured to:

send to a UE (120), e.g. by means of a sending unit, a PDCCH order triggering a RA, wherein the PDCCH order comprises a PRACH preamble index and one or more of an indication pointing to the PUSCH resource, an MCS scheme and/or a power allocated for PUSCH transmissions, receive from the UE (120), e.g. by means of a receiving unit, a transmission comprising both a PRACH preamble and a Msg 3. The PRACH preamble and Msg 3 may e.g. be received in the same or in subsequent sub frames.

Embodiment 22. A network node (110), such as e.g. an eNB or an gNB, for handling a two-step Random Access Channel, RACH, procedure in a wireless communications network (100), the network node (110) being configured to:

send to a UE (120), e.g. by means of a sending unit, an RRC signalling triggering a RA, wherein the RRC signalling comprises a PRACH preamble index and one or more of an indication pointing to the PUSCH resource, an MCS scheme and/or a power allocated for PUSCH transmissions, receive from the UE (120), e.g. by means of a receiving unit, a transmission comprising both a PRACH preamble and a Msg 3. The PRACH preamble and Msg 3 may e.g. be received in the same or in subsequent sub frames.

Embodiment 23. The network node (110) according to Embodiment 21 or 22, wherein the network node (110) further is configured to:

send to the UE (120), e.g. by means of a sending unit, subsequent to receiving the transmission comprising both a PRACH preamble and a Msg 3, a transmission comprising a timing advance (TA) and a Msg 4 for contention resolution.

Embodiment 24. The network node (110) according to any of the Embodiments 21 to 23, wherein the network node is configured to receive the Msg3 on a PUSCH resource indicated by a grant obtained from a PUSCH resource table based on the indication sent to the UE (120).

Embodiment 25. The method according to any of the previous Embodiments 1 to 6, wherein the step of obtaining (401) the PUSCH resource table comprises receiving a PDCCH order and/or an RRC signalling comprising the PUSCH resource table from the network node 110.

Embodiment 26. The method according to any of the previous Embodiments 9 to 12, wherein the method further comprises:

sending (501), to a user equipment, UE, (120), a PDCCH order and/or an RRC signalling comprising the PUSCH resource table.

The invention claimed is:

1. A method, performed by a user equipment, UE, for handling a two-step Random Access Channel, RACH, procedure, in a wireless communications network, the method comprising:

obtaining a Physical Uplink Shared Channel, PUSCH, resource table comprising a plurality of PUSCH resources, each PUSCH resource out of the plurality of PUSCH resources corresponds to a preamble assigned for the two-step RACH procedure, obtaining the PUSCH resource table comprises receiving a Physical Downlink Control Channel, PDCCH, order and a Radio Resource Control, RRC, signaling comprising the PUSCH resource table from the network node;

when a Random Access, RA, event is triggered:

obtaining a Physical Random Access Channel, PRACH, preamble corresponding to the RA event and a desired grant size, by randomly selecting a preamble mapping to an entry of the PUSCH resource table, providing a required size of a PUSCH resource for the triggered RA event, the preamble being selected from a group of preambles corresponding to the RA event; and obtaining a grant from the PUSCH resource table based on the obtained PRACH preamble, which grant comprises an indication of a PUSCH resource to use for a Msg 3 transmission in Uplink, UL, in the table, each PUSCH resource entry in the table being associated with the following characteristics:
indices for Bandwidth Parts (BWPs); and
a time period that the grant is valid since the PUSCH transmission starts.

2. The method according to claim 1, wherein the method further comprises:
transmitting, to a network node, the obtained PRACH preamble and a Msg 3 in the same transmission.

3. The method according to claim 1, wherein the step of transmitting further comprises:
transmitting, to the network node, the obtained PRACH preamble on a next available PRACH occasion, wherein the PRACH occasions may be predetermined.

4. The method according to claim 1, wherein the step of transmitting further comprises:
transmitting the Msg 3 on the PUSCH resource indicated by the grant obtained from the PUSCH resource table.

5. The method according to claim 1, wherein the step of obtaining the PRACH preamble further comprises:
receiving a Physical Downlink Control Channel, PDCCH, order from a network node triggering the RA, wherein the PDCCH order comprises a PRACH preamble index and at least one of an indication pointing to the PUSCH resource, a Modulation and Coding Scheme, MCS, and a power allocated for PUSCH transmissions; and
wherein the step of obtaining the grant from the PUSCH resource table further comprises:
obtaining the PUSCH resource from the PUSCH resource table based on the received indications.

6. The method according to claim 1, wherein the step of obtaining the PRACH preamble further comprises:
receiving a Radio Resource Control, RRC, signalling from a network node triggering the RA, wherein the RRC signalling comprises a PRACH preamble index and at least one of an indication pointing to the PUSCH resource, an MCS and a power allocated for PUSCH transmissions; and
wherein the step of obtaining the grant from the PUSCH resource table further comprises:
obtaining the PUSCH resource from the PUSCH resource table based on the received indications.

7. A method performed by a network node, for handling a two-step Random Access Channel, RACH, procedure in a wireless communications network, the method comprising:
sending, to a user equipment, UE, a Physical Downlink Control Channel, PDCCH, order and a Radio Resource Control, RRC, signalling comprising a PUSCH resource table;
sending, to the UE, any one of: a PDCCH order and a RRC signalling, the any one of the PDCCH order and the RRC signalling is triggering a Random Access, RA, and the any one of the PDCCH order and the RRC signalling comprises a Physical Random Access Channel, PRACH, preamble index and at least one of an indication pointing to a Physical Uplink Shared Channel, PUSCH, resource, a Modulation and Coding Scheme, MCS, and a power allocated for PUSCH transmissions; and
receiving, from the UE, a transmission comprising both a PRACH preamble and a Msg 3, the PRACH preamble and Msg 3 being received in the same sub frame, the PRACH preamble being selected from a group of preambles corresponding to the RA event, the Msg3 being received on a PUSCH resource indicated by a grant obtained from the PUSCH resource table based on the indication sent to the UE, and, in the table, each PUSCH resource entry in the table being associated with the following characteristics:
indices for Bandwidth Parts (BWPs); and
a time period that the grant is valid since the PUSCH transmission starts.

8. The method according to claim 7, wherein the method further comprises:
sending, to the UE, subsequent to receiving the transmission comprising both a PRACH preamble and a Msg 3, a transmission comprising a Timing Advance, TA, and a Msg 4 for contention resolution.

9. A user equipment, UE, for handling a two-step Random Access Channel, RACH, procedure, in a wireless communications network, the UE being configured to:
obtain a Physical Uplink Shared Channel, PUSCH, resource table comprising a plurality of PUSCH resources, each PUSCH resource out of the plurality of PUSCH resources corresponds to a preamble assigned for the two-step RACH procedure, obtain the PUSCH resource table comprises receiving a Physical Downlink Control Channel, PDCCH, order and a Radio Resource Control, RRC, signaling comprising the PUSCH resource table from the network node;
when a Random Access, RA, event is triggered:
obtain a Physical Random Access Channel, PRACH, preamble corresponding to the RA event and a desired grant size, by randomly selecting a preamble adapted to map to an entry of the Physical Uplink Shared Channel, PUSCH, resource table, adapted to provide a required size of a PUSCH resource for the triggered RA event, the preamble being selected from a group of preambles corresponding to the RA event; and
obtain a grant from the PUSCH resource table based on the obtained PRACH preamble, which grant comprises an indication of a PUSCH resource to use for a Msg 3 transmission in Uplink, UL, in the table, each PUSCH resource entry in the table being associated with the following characteristics:
indices for Bandwidth Parts (BWPs); and
a time period that the grant is valid since the PUSCH transmission starts.

10. The UE according to claim 9, wherein the UE further is configured to:
transmit, to a network node, the obtained PRACH preamble and a Msg 3 in the same transmission.

11. The UE according to claim 9, wherein the UE further is configured to:
transmit to the network node the obtained PRACH preamble on a next available PRACH occasion.

12. The UE according to claim 9, wherein the UE further is configured to:
transmit the Msg 3 on the PUSCH resource indicated by the grant obtained from the PUSCH resource table.

13. The UE according to claim 9, wherein the UE further is configured to:
  receive a Physical Downlink Control Channel, PDCCH, order from a network node triggering the RA, wherein the PDCCH order comprises a PRACH preamble index and at least one of an indication pointing to the PUSCH resource, an indication pointing to a Modulation and Coding Scheme, MCS, and an indication pointing to a power allocated for PUSCH transmissions;
  obtain the PUSCH resource from the PUSCH resource table based on the received indications.

14. The UE according to claim 9, wherein the UE further is configured to: receive a Radio Resource Control, RRC, signalling from a network node triggering the RA, wherein the RRC signalling comprises a PRACH preamble index and at least one of an indication pointing to the PUSCH resource, an indication pointing to an MCS and an indication pointing to a power allocated for PUSCH transmissions; obtain the PUSCH resource from the PUSCH resource table based on the received indications.

15. A network node for handling a two-step Random Access Channel, RACH, procedure in a wireless communications network, the network node being configured to:
  send, to a user equipment, UE, a Physical Downlink Control Channel, PDCCH, order and a Radio Resource Control, RRC, signaling comprising a Physical Uplink Shared Channel, PUSCH, resource table;
  send to a UE any one of: a PDCCH order and a RRC signalling, any one of the PDCCH order and the RRC signalling is triggering a Random Access, RA, and the any one of the PDCCH order and the RRC signalling comprises a Physical Random Access Channel, PRACH, preamble index and at least one of an indication pointing to a Physical Uplink Shared Channel, PUSCH, resource, a Modulation and Coding Scheme, MCS, and a power allocated for PUSCH transmissions; and
  receive from the UE a transmission comprising both a PRACH preamble and a Msg 3, wherein the PRACH preamble and Msg 3 are received in the same or in subsequent sub frames, the PRACH preamble being selected from a group of preambles corresponding to the RA event, the Msg3 being adapted to be received on a PUSCH resource indicated by a grant adapted to be obtained from a PUSCH resource table based on the indication sent to the UE, and, in the table, each PUSCH resource entry in the table being adapted to be associated with the following characteristics:
  indices for Bandwidth Parts (BWPs); and
  a time period that the grant is valid since the PUSCH transmission starts.

16. The network node according to claim 15, wherein the network node further is configured to:
  send to the UE subsequent to receiving the transmission comprising both a PRACH preamble and a Msg 3, a transmission comprising a Timing Advance, TA, and a Msg 4 for contention resolution.

* * * * *